United States Patent
Murata et al.

[11] Patent Number: 6,109,025
[45] Date of Patent: Aug. 29, 2000

[54] COMPRESSION IGNITION TYPE ENGINE

[75] Inventors: Hiroki Murata, Susono; Shizuo Sasaki, Numazu, both of Japan

[73] Assignee: Toyota Jidosha Kabushiki Kaisha, Toyota, Japan

[21] Appl. No.: 09/251,991

[22] Filed: Feb. 18, 1999

[30] Foreign Application Priority Data

Mar. 17, 1998 [JP] Japan .................................. 10-067210

[51] Int. Cl.$^7$ .................................................... F01N 3/00
[52] U.S. Cl. ................ 60/297; 60/278; 60/280; 60/285; 123/568.19; 180/65.3; 180/65.2; 290/40 A; 290/40 B
[58] Field of Search ........................ 60/278, 297, 295, 60/285, 276, 301, 280; 290/40 A, 40 B, 40 C; 123/568.19, 568.21; 180/65.3, 65.4, 65.2

[56] References Cited

U.S. PATENT DOCUMENTS

| 4,142,493 | 3/1979 | Schira et al. . |
| 4,454,854 | 6/1984 | Gotoh et al. . |
| 5,172,550 | 12/1992 | Takeshima . |
| 5,323,868 | 6/1994 | Kawashima ............................ 180/65.4 |
| 5,482,020 | 1/1996 | Shimizu et al. . |
| 5,632,144 | 5/1997 | Isobe . |
| 5,732,554 | 3/1998 | Sasaki et al. . |
| 5,785,138 | 7/1998 | Yoshida .................................. 180/65.2 |
| 5,826,427 | 10/1998 | Yanagihara et al. ...................... 60/276 |
| 5,890,360 | 4/1999 | Sasaki et al. ............................. 60/278 |
| 5,937,639 | 8/1999 | Sasaki et al. ............................. 60/278 |
| 6,009,965 | 1/2000 | Takanohashi et al. ................. 180/65.2 |

FOREIGN PATENT DOCUMENTS

| 62-18326 | 1/1987 | Japan . |
| 4-334750 | 11/1992 | Japan . |
| 6-346763 | 12/1994 | Japan . |
| 7-4287 | 1/1995 | Japan . |
| WO 93/07363 | 4/1993 | WIPO . |

*Primary Examiner*—Judy Swayne
*Assistant Examiner*—Binh Tran
*Attorney, Agent, or Firm*—Oliff & Berridge, PLC

[57] ABSTRACT

A compression ignition type engine, wherein a first combustion where the amount of the recirculated exhaust gas supplied to the combustion chamber is larger than the amount of recirculated exhaust gas where the amount of production of soot peaks and almost no soot is produced and a second combustion where the amount of recirculated exhaust gas supplied to the combustion chamber is smaller than the amount of recirculated exhaust gas where the amount of production of soot peaks are selectively switched between. When NOx should be released from an NOx absorbent arranged in an exhaust passage of the engine, the second combustion switched to the first combustion and the amount of reduction of the output torque of the engine is compensated for by the output torque of an electric motor.

14 Claims, 19 Drawing Sheets

COMPRESSION IGNITION TYPE ENGINE

BACKGROUND OF THE INVENTION

1. Field of the Invention

The present invention relates to a compression ignition type engine.

2. Description of the Related Art

In the past, in an internal combustion engine, for example, a diesel engine, the production of NOx has been suppressed by connecting the engine exhaust passage and the engine intake passage by an exhaust gas recirculation (EGR) passage so as to cause the exhaust gas, that is, the EGR gas, to recirculate in the engine intake passage through the EGR passage. In this case, the EGR gas has a relatively high specific heat and therefore can absorb a large amount of heat, so the larger the amount of EGR gas, that is, the higher the EGR rate (amount of EGR gas/(amount of EGR gas + amount of intake air), the lower the combustion temperature in the engine intake passage. When the combustion temperature falls, the amount of NOx produced falls and therefore the higher the EGR rate, the lower the amount of NOx produced.

In this way, in the past, the higher the EGR rate, the lower the amount of NOx produced can become. If the EGR rate is increased, however, the amount of soot produced, that is, the smoke, starts to sharply rise when the EGR rate passes a certain limit. In this point, in the past, it was believed that if the EGR rate was increased, the smoke would increase without limit. Therefore, it was believed that the EGR rate at which smoke starts to rise sharply was the maximum allowable limit of the EGR rate.

Therefore, in the past, the EGR rate was set within a range not exceeding the maximum allowable limit. The maximum allowable limit of the EGR rate differed considerably according to the type of the engine and the fuel, but was from 30 percent to 50 percent or so. Accordingly, in conventional diesel engines, the EGR rate was suppressed to 30 percent to 50 percent at a maximum.

Since it was believed in the past that there was a maximum allowable limit to the EGR rate, in the past the EGR rate had been set so that the amount of NOx produced would become as small as possible within a range not exceeding that maximum allowable limit. Even if the EGR rate is set in this way so that the amount of NOx produced becomes as small as possible, however, there are limits to the reduction of the amount of production of NOx. In practice, therefore, a considerable amount of NOx continues being produced.

Therefore, known in the art is a diesel engine which disposes in the engine exhaust passage a NOx absorbent which absorbs NOx when the air-fuel ratio of exhaust gas flowing into the NOx absorbent is lean and releases and reduces the absorbed NOx when the air-fuel ratio of the exhaust gas flowing into the NOx absorbent is rich or the stoichiometric air-fuel ratio (International Publication WO93/07363). In this diesel engine, in the same way as the conventional diesel engines, the air-fuel ratio in the combustion chamber is lean, therefore the NOx produced in the combustion chamber is absorbed by the NOx absorbent. Further, in this diesel engine, when the amount of the NOx absorbed in the NOx absorbent exceeds a predetermined amount, the air-fuel ratio in the combustion chamber is temporarily made rich and therefore the NOx is released from the NOx absorbent and the released NOx is reduced.

In such a diesel engine, however, there is the problem that when the air-fuel ratio in the combustion chamber is made rich, a large amount of smoke is produced.

On the other hand, the present inventors discovered in the process of studies on the combustion in diesel engines that if the EGR rate is made larger than the maximum allowable limit, the smoke sharply increases as explained above, but there is a peak to the amount of the smoke produced and once this peak is passed, if the EGR rate is made further larger, the smoke starts to sharply decrease and that if the EGR rate is made at least 70 percent during engine idling or if the EGR gas is force cooled and the EGR rate is made at least 55 percent or so, the smoke will almost completely disappear, that is, almost no soot will be produced, even if the air-fuel ratio in the combustion chamber is made rich. That is, the present inventors discovered a new combustion method enabling the air-fuel ratio in the combustion chamber to be made rich without causing the production of smoke.

SUMMARY OF THE INVENTION

An object of the present invention is to provide a compression ignition type engine using this new method of combustion and thereby capable of causing the release of NOx from an NOx absorbent without production of smoke.

According to the present invention, there is provided a compression ignition type engine in which an amount of production of soot gradually increases and then peaks when an amount of inert gas in a combustion chamber increases and in which a further increase of the amount of inert gas in the combustion chamber results in a temperature of fuel and surrounding gas at the time of combustion in the combustion chamber becoming lower than a temperature of production of soot and therefore almost no production of soot any longer, the engine comprising: switching means for selectively switching between a first combustion where the amount of the inert gas in the combustion chamber is larger than the amount of inert gas where the amount of production of soot peaks and almost no soot is produced and a second combustion where the amount of inert gas in the combustion chamber is smaller than the amount of inert gas where the amount of production of soot peaks; an NOx absorbent disposed in an exhaust passage of the engine and absorbing NOx when an air-fuel ratio of an exhaust gas flowing into the NOx absorbent is lean, the NOx absorbent releasing an absorbed NOx when the air-fuel ratio of the exhaust gas flowing into the NOx absorbent is rich or the stoichiometric air-fuel ratio; and drive power generating means for generating drive power separately from a drive power of the engine, wherein, when NOx should be released from the NOx absorbent when the second combustion is being performed, the second combustion is switched to the first combustion and the air-fuel ratio in the combustion chamber is made rich or the stoichiometric air-fuel ratio by reducing an amount of fuel supplied to the engine and the drive power generating means generates the drive power.

BRIEF DESCRIPTION OF THE DRAWINGS

The present invention may be more fully understood from the description of the preferred embodiments of the invention set forth below together with the accompanying drawings, in which.

DESCRIPTION OF THE PREFERRED EMBODIMENTS

Figure 1:
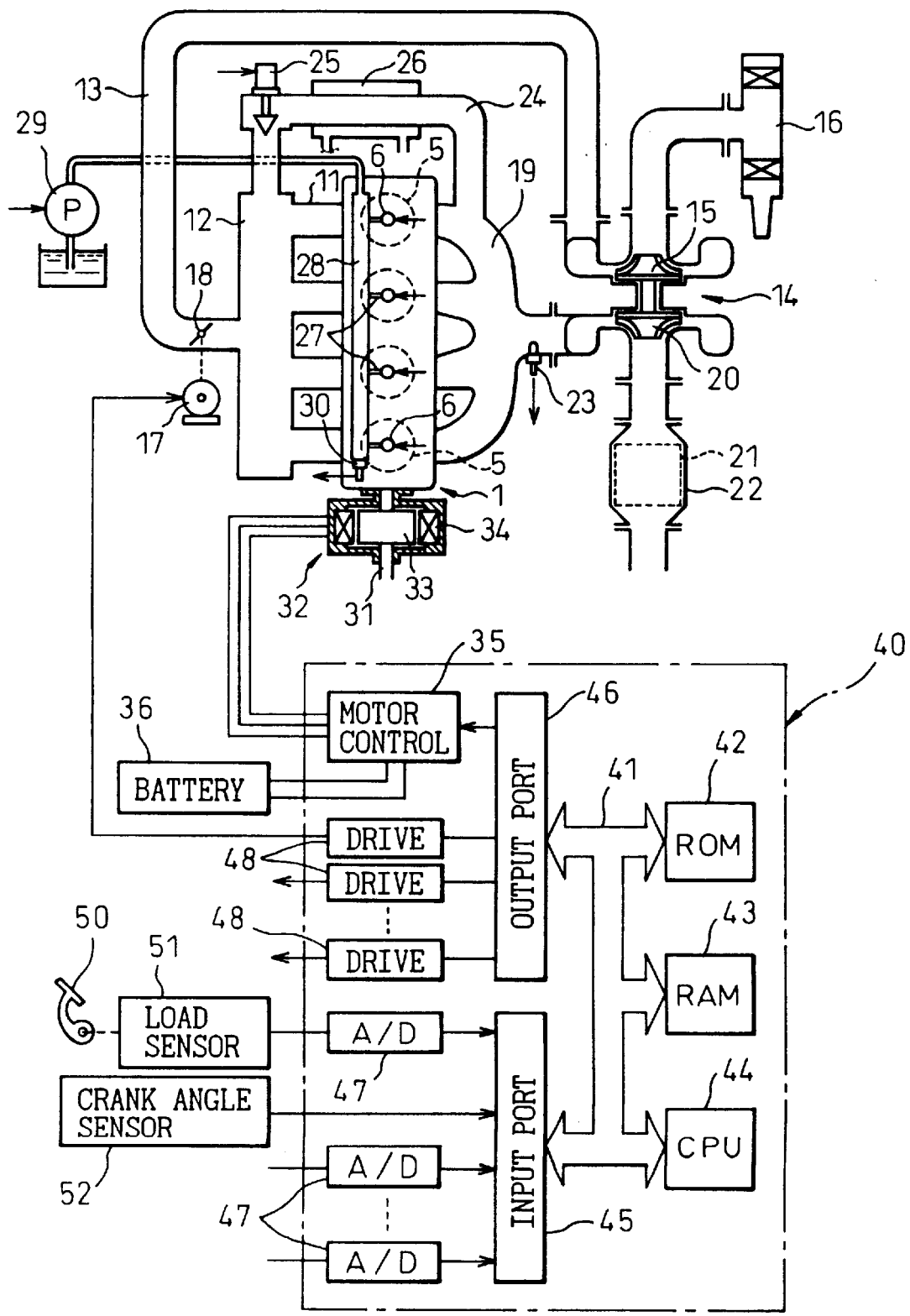
FIG. 1 is an overall view of a compression ignition type engine.
Figure 2:
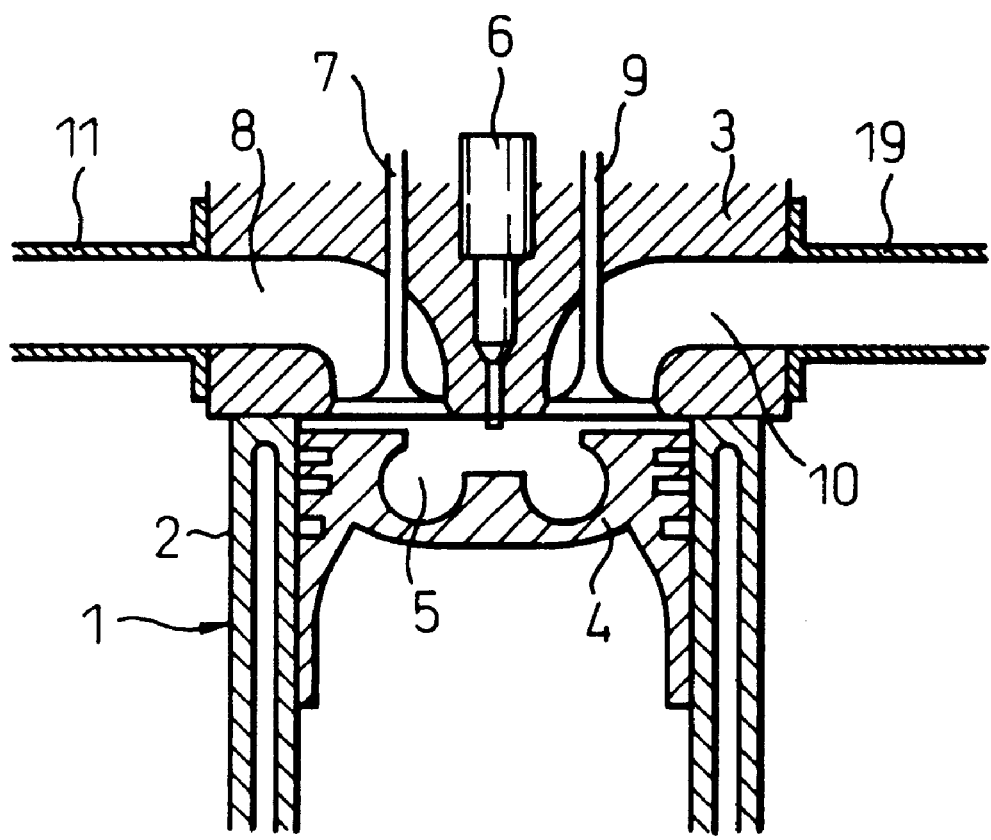
FIG. 2 is a side sectional view of the engine body.

FIG. 1 and FIG. 2 are views of the case of application of the present invention to a four-stroke compression ignition type engine.

Referring to FIG. 1 and FIG. 2, 1 shows an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected through a corresponding intake tube 11 to the surge tank 12. The surge tank 12 is connected through an intake duct 13 and a compressor 15 of an exhaust turbocharger 14 to an air cleaner 16. A throttle valve 18 driven by an electric motor 17 is arranged in the intake duct 13. On the other hand, the exhaust port 10 is connected through an exhaust manifold 19 and exhaust turbine 20 of the exhaust turbocharger 14 to a catalytic converter 22 housing a catalyst 21 having an oxidation function. An air-fuel ratio sensor 23 is arranged in the exhaust manifold 19.

The exhaust manifold 19 and surge tank 12 are connected with each other through an EGR passage 24. An electrically controlled EGR control valve 25 is arranged in an EGR passage 24. Further, a cooling apparatus 26 for cooling the EGR gas flowing through the EGR passage 24 is provided around the EGR passage 25. In the embodiment shown in FIG. 1, the engine cooling water is guided to the cooling apparatus 26 where the engine cooling water is used to cool the EGR gas.

On the other hand, each fuel injector 6 is connected through a fuel supply tube 27 to the fuel reservoir, that is, a common rail 28. Fuel is supplied to the common rail 28 from an electrically controlled variable discharge fuel pump 29. Fuel supplied in the common rail 28 is supplied through each fuel supply tube 27 to the fuel injectors 6. A fuel pressure sensor 30 for detecting the fuel pressure in the common rail 28 is attached to the common rail 28. The amount of discharge of the fuel pump 29 is controlled based on the output signal of the fuel pressure sensor 30 so that the fuel pressure in the common rail 28 becomes the target fuel pressure.

An electric motor 32 is attached to an output shaft 31 of the engine. In the embodiment shown in FIG. 1, the electric motor 32 is comprised of an alternating current synchronous electric motor provided with a rotor 33 attached on the output shaft 31 of the engine and mounting a plurality of permanent magnets on its outer circumference and a stator 34 around which is wound an exciting coil forming a rotating magnetic field. The exciting coil of the stator 34 is connected to a motor drive control circuit 35, while the motor drive control circuit 35 is connected to a battery 36 generating a DC high voltage.

An electronic control unit 40 is comprised of a digital computer and is provided with a ROM (read only memory) 42, a RAM (random access memory) 43, a CPU (microprocessor) 44, an input port 45, and an output port 46 connected with each other by a bidirectional bus 41. The output signal of the air-fuel ratio sensor 23 is input through a corresponding AD converter 47 to the input port 45. Further, the output signal of the fuel pressure sensor 30 is input through a corresponding AD converter 47 to the input port 45. An accelerator pedal 50 has connected to it a load sensor 51 for generating an output voltage proportional to the amount of depression L of the accelerator pedal 50. The output voltage of the load sensor 51 is input through a corresponding AD converter 47 to the input port 45. Further, the input port 45 has connected to it a crank angle sensor 52 for generating an output pulse each time the crankshaft rotates by for example 30°. On the other hand, the output port 46 has connected to it through a corresponding drive circuit 48 the fuel injector 6, electric motor 17, EGR control valve 25, fuel pump 29, and motor drive control circuit 35.

Ordinarily, the supply of power to the exciting coil of the stator 34 of the electric motor 32 is stopped. At this time, the rotor 33 rotates along with the output shaft 31 of the engine. On the other hand, when the electric motor 32 is driven, the DC high voltage of the battery 36 is converted at the motor drive control circuit 35 to a three-phase alternating current with a frequency fm and a current Im. This three-phase alternating current is supplied to the exciting coil of the stator 34. This frequency fm is the frequency necessary for making the rotating magnetic field produced by the exciting coil rotate in synchronization with the rotation of the rotor 33. This frequency fm is calculated by the CPU 44 based on the output signal of the rotational speed sensor 52. In the motor drive control circuit 35, the frequency fm is made the frequency of the three-phase alternating current.

On the other hand, the output torque of the electric motor 32 is substantially proportional to the current value Im of the three-phase alternating current. This current value Im is calculated in the CPU 44 based on the requested output torque of the electric motor 32. In the motor drive control circuit 35, this current value Im is made the current value of the three-phase alternating current.

Further, if the electric motor 32 is placed in a state driven by the engine, the battery 36 is charged by the power produced at this time. Whether or not to drive the electric motor 32 by the engine is judged by the CPU 44. When it is judged that the electric motor 32 should be driven by the engine, the motor control drive circuit 5 controls the system so that the battery 36 is charged by the power produced by the electric motor 32.

Figure 3:
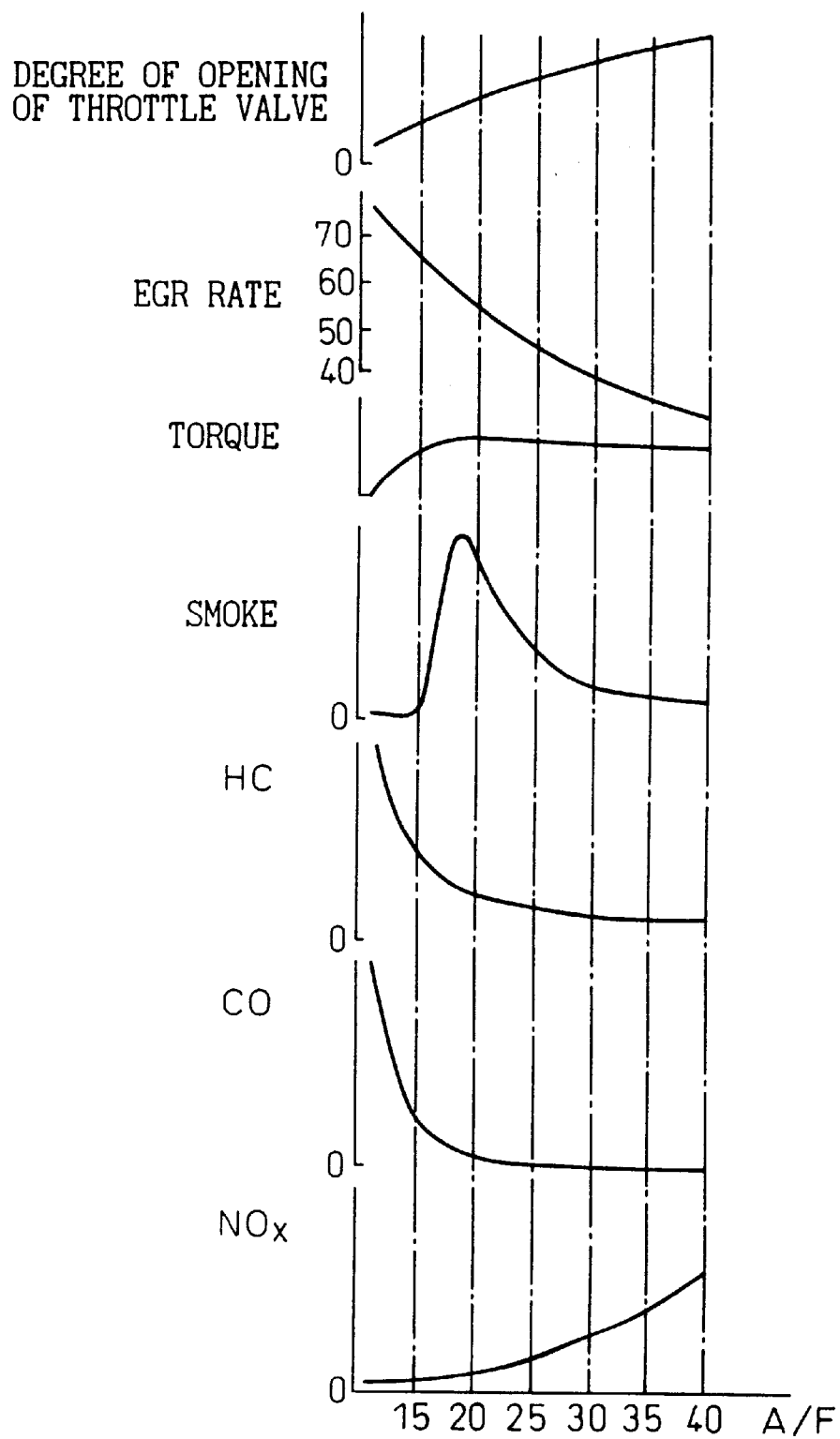
FIG. 3 is a view of the amount of generation of smoke and NOx.

FIG. 3 shows an example of an experiment showing the changes in the output torque and the changes in the amount of smoke, HC, CO, and NOx exhausted when changing the air-fuel ratio A/F (abscissa in FIG. 3) by changing the opening degree of the throttle valve 18 and the EGR rate at the time of engine low load operation. As will be understood from FIG. 3, in this experiment, the EGR rate becomes larger the smaller the air-fuel ratio A/F. When below the stoichiometric air-fuel ratio (≈14.6), the EGR rate becomes over 65 percent.

As shown in FIG. 3, if increasing the EGR rate to reduce the air-fuel ratio A/F, when the EGR rate becomes close to 40 percent and the air-fuel ratio A/F becomes 30 or so, the amount of smoke produced starts to increase. Next, when the EGR rate is further raised and the air-fuel ratio A/F is made smaller, the amount of smoke produced sharply increases and peaks. Next, when the EGR rate is further raised and the air-fuel ratio A/F is made smaller, the smoke sharply falls. When the EGR rate is made over 65 percent and the air-fuel ratio A/F becomes close to 15.0, the smoke produced becomes substantially zero. That is, almost no soot is produced any longer. At this time, the output torque of the engine falls somewhat and the amount of NOx produced becomes considerably lower. On the other hand, at this time, the amounts of HC and CO produced start to increase.

Figure 4A:
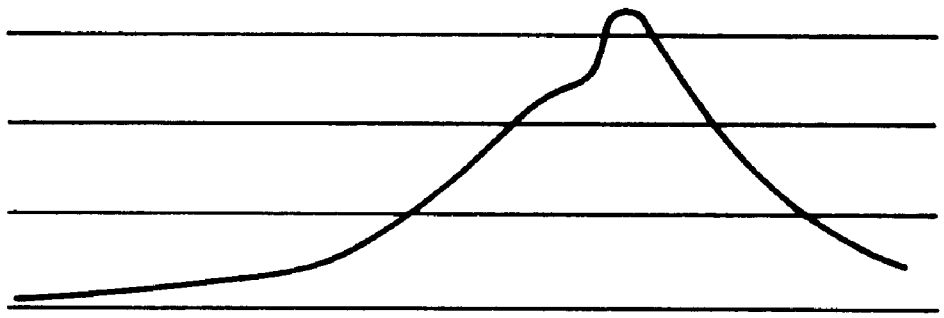
FIGS. 4A and 4B are views of the combustion pressure.
Figure 4B:
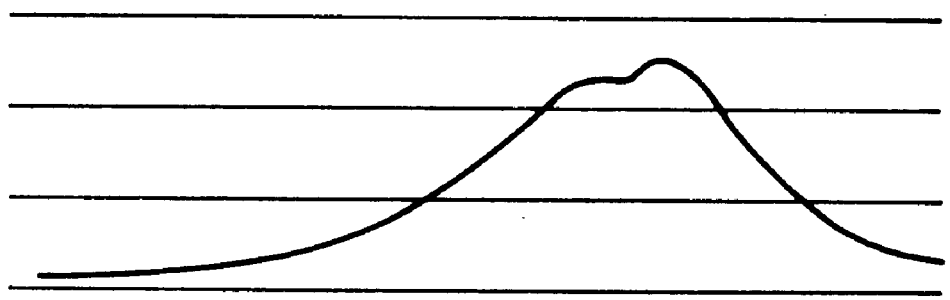

FIG. 4A shows the changes in compression pressure in the combustion chamber 5 when the amount of smoke produced is the greatest near an air-fuel ratio A/F of 21. FIG. 4B shows the changes in compression pressure in the combustion chamber 5 when the amount of smoke produced is substantially zero near an air-fuel ratio A/F of 18. As will be understood from a comparison of FIG. 4A and FIG. 4B, the combustion pressure is lower in the case shown in FIG. 4B where the amount of smoke produced is substantially zero than the case shown in FIG. 4A where the amount of smoke produced is large.

The following may be said from the results of the experiment shown in FIG. 3 and FIGS. 4A and 4B. That is, first, when the air-fuel ratio A/F is less than 15.0 and the amount of smoke produced is substantially zero, the amount of NOx produced falls considerably as shown in FIG. 3. The fact that the amount of NOx produced falls means that the combustion temperature in the combustion chamber 5 falls. Therefore, it can be said that when almost no soot is produced, the combustion temperature in the combustion chamber 5 becomes lower. The same thing may be said from FIGS. 4A and 4B. That is, in the state shown in FIG. 4B where almost no soot is produced, the combustion pressure becomes lower, therefore the combustion temperature in the combustion chamber 5 becomes lower at this time.

Figure 5:
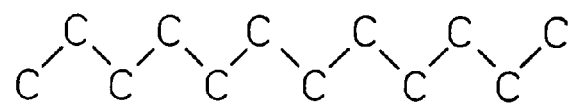
FIG. 5 is a view of a fuel molecule.
Figure 5:
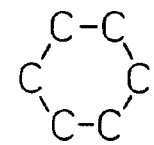
Figure 5:
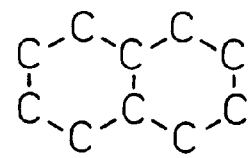

Second, when the amount of smoke produced, that is, the amount of soot produced, becomes substantially zero, as shown in FIG. 3, the amounts of HC and CO exhausted increase. This means that the hydrocarbons are exhausted without growing into soot. That is, the straight chain hydrocarbons and aromatic hydrocarbons contained in the fuel and shown in FIG. 5 decompose when raised in temperature in an oxygen poor state resulting in the formation of a precursor of soot. Next, soot mainly comprised of solid masses of carbon atoms is produced. In this case, the actual process of production of soot is complicated. How the precursor of soot is formed is not clear, but whatever the case, the hydrocarbons shown in FIG. 5 grow to soot through the soot precursor. Therefore, as explained above, when the amount of production of soot becomes substantially zero, the amount of exhaust of HC and CO increases as shown in FIG. 3, but the HC at this time is a soot precursor or a state of hydrocarbons before that.

Summarizing these considerations based on the results of the experiments shown in FIG. 3 and FIGS. 4A and 4B, when the combustion temperature in the combustion chamber 5 is low, the amount of soot produced becomes substantially zero. At this time, a soot precursor or a state of hydrocarbons before that is exhausted from the combustion chamber 5. More detailed experiments and studies were conducted on this. As a result, it was learned that when the temperature of the fuel and the gas around the fuel in the combustion chamber 5 is below a certain temperature, the process of growth of soot stops midway, that is, no soot at all is produced and that when the temperature of the fuel and its surroundings in the combustion chamber 5 becomes higher than a certain temperature, soot is produced.

The temperature of the fuel and its surroundings when the process of production of hydrocarbons stops in the state of the soot precursor, that is, the above certain temperature, changes depending on various factors such as the type of the fuel, the air-fuel ratio, and the compression ratio, so it cannot be said what degree it is, but this certain temperature is deeply related with the amount of production of NOx. Therefore, this certain temperature can be defined to a certain degree from the amount of production of NOx. That is, the greater the EGR rate, the lower the temperatures of the fuel and the gas surrounding it at the time of combustion and the lower the amount of NOx produced. At this time, when the amount of NOx produced becomes around 10 ppm or less, almost no soot is produced any more. Therefore, the above certain temperature substantially matches the temperature when the amount of NOx produced becomes 10 ppm or less.

Once soot is produced, it is impossible to remove it by after-treatment using a catalyst having an oxidation function etc. As opposed to this, a soot precursor or a state of hydrocarbons before this can be easily removed by after-treatment using a catalyst having an oxidation function etc. Considering after-treatment by a catalyst having an oxidation function etc., there is an extremely great difference between whether the hydrocarbons are exhausted from the combustion chamber 5 in the form of a soot precursor or a state before that or exhausted from the combustion chamber 5 in the form of soot. The new combustion system used in the present invention is based on the idea of exhausting the hydrocarbons from the combustion chamber 5 in the form of a soot precursor or a state before that without allowing the production of soot in the combustion chamber 5 and causing the hydrocarbons to oxidize by a catalyst having an oxidation function etc.

Now, to stop the growth of hydrocarbons in the state before the production of soot, it is necessary to suppress the temperature of the fuel and the gas around it at the time of combustion in the combustion chamber 5 to a temperature lower than the temperature where soot is produced. In this case, it was learned that the heat absorbing action of the gas around the fuel at the time of combustion of the fuel has an extremely great effect in suppression of the temperature of the fuel and the gas around it.

That is, if there is only air around the fuel, the vaporized fuel will immediately react with the oxygen in the air and burn. In this case, the temperature of the air away from the fuel does not rise that much. Only the temperature around the fuel becomes locally extremely high. That is, at this time, the air away from the fuel does not absorb the heat of combustion of the fuel much at all. In this case, since the combustion temperature becomes extremely high locally, the unburned hydrocarbons receiving the heat of combustion produce soot.

On the other hand, when there is fuel in a mixed gas of a large amount of inert gas and a small amount of air, the situation is somewhat different. In this case, the evaporated fuel disperses in the surroundings and reacts with the oxygen mixed in the inert gas to burn. In this case, the heat of combustion is absorbed by the surrounding inert gas, so the combustion temperature no longer rises that much. That is, it becomes possible to keep the combustion temperature low. That is, the presence of inert gas plays an important role in the suppression of the combustion temperature. It is possible to keep the combustion temperature low by the heat absorbing action of the inert gas.

In this case, to suppress the temperatures of the fuel and the gas around it to a temperature lower than the temperature at which soot is produced, an amount of inert gas enough to absorb an amount of heat sufficient for lowering the temperatures is required. Therefore, if the amount of fuel increases, the amount of inert gas required increases along with the same. Note that in this case the larger the specific heat of the inert gas, the stronger the heat absorbing action. Therefore, the inert gas is preferably a gas with a large specific heat. In this regard, since $CO_2$ and EGR gas have relatively large specific heats, it may be said to be preferable to use EGR gas as the inert gas.

Figure 6:
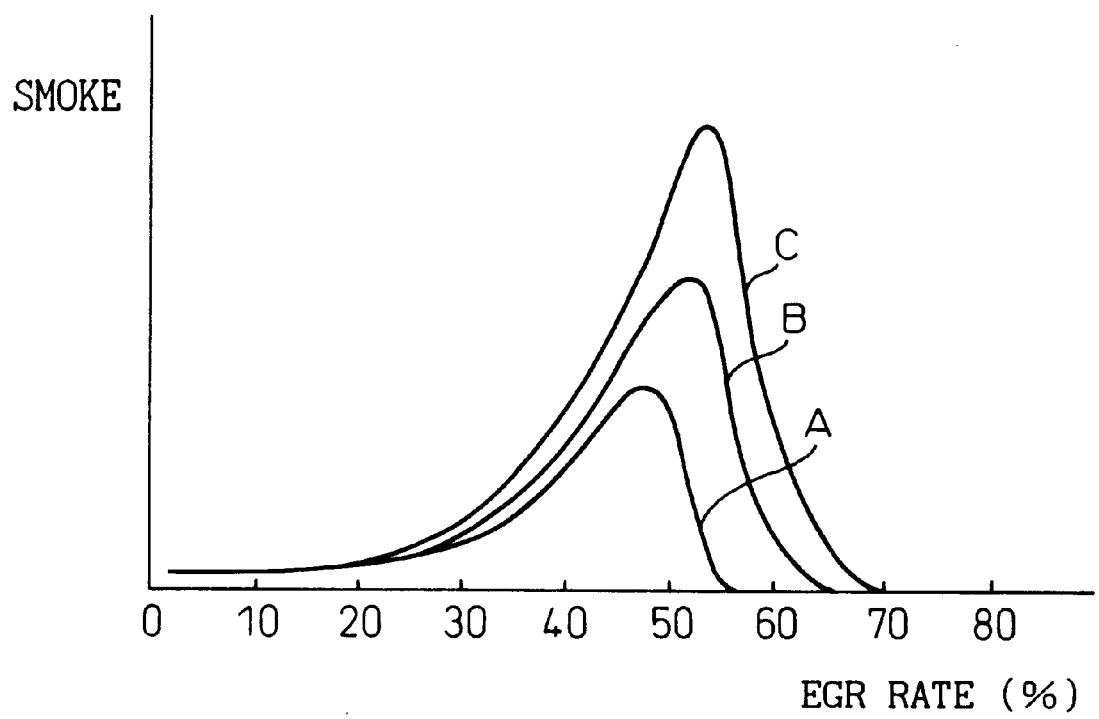
FIG. 6 is a view of the relationship between the amount of smoke produced and the EGR rate.

FIG. 6 shows the relationship between the EGR rate and smoke when changing the degree of cooling of the EGR gas using the EGR gas as an inert gas. That is, in FIG. 6, the curve A shows the case when force cooling the EGR gas to maintain the temperature of the EGR gas at about 90° C., the curve B shows the case when cooling the EGR gas by a small sized cooling device, and the curve C shows the case when not force cooling the EGR gas.

As shown by the curve A in FIG. 6, when force cooling the EGR gas, the amount of soot produced peaks when the EGR rate becomes slightly lower than 50 percent. In this case, almost no soot is produced any longer when the EGR rate is made at least about 55 percent.

On the other hand, as shown by the curve B in FIG. 6, when slightly cooling the EGR gas, the amount of soot produced peaks when the EGR rate becomes slightly higher than 50 percent. In this case, almost no soot is produced any longer when the EGR rate is made at least about 65 percent.

Further, as shown by the curve C in FIG. 6, when not force cooling the EGR gas, the amount of soot produced peaks when the EGR rate is near 55 percent. In this case, almost no soot is produced any longer when the EGR rate is made at least about 70 percent.

Note that FIG. 6 shows the amount of smoke produced when the engine load is relatively high. When the engine load becomes smaller, the EGR rate where the amount of soot produced peaks falls somewhat and the lower limit of the EGR rate where almost no soot is produced any longer falls somewhat as well. In this way, the lower limit of the EGR rate where almost no soot is produced any longer changes in accordance with the degree of cooling of the EGR gas and the engine load.

Figure 7:
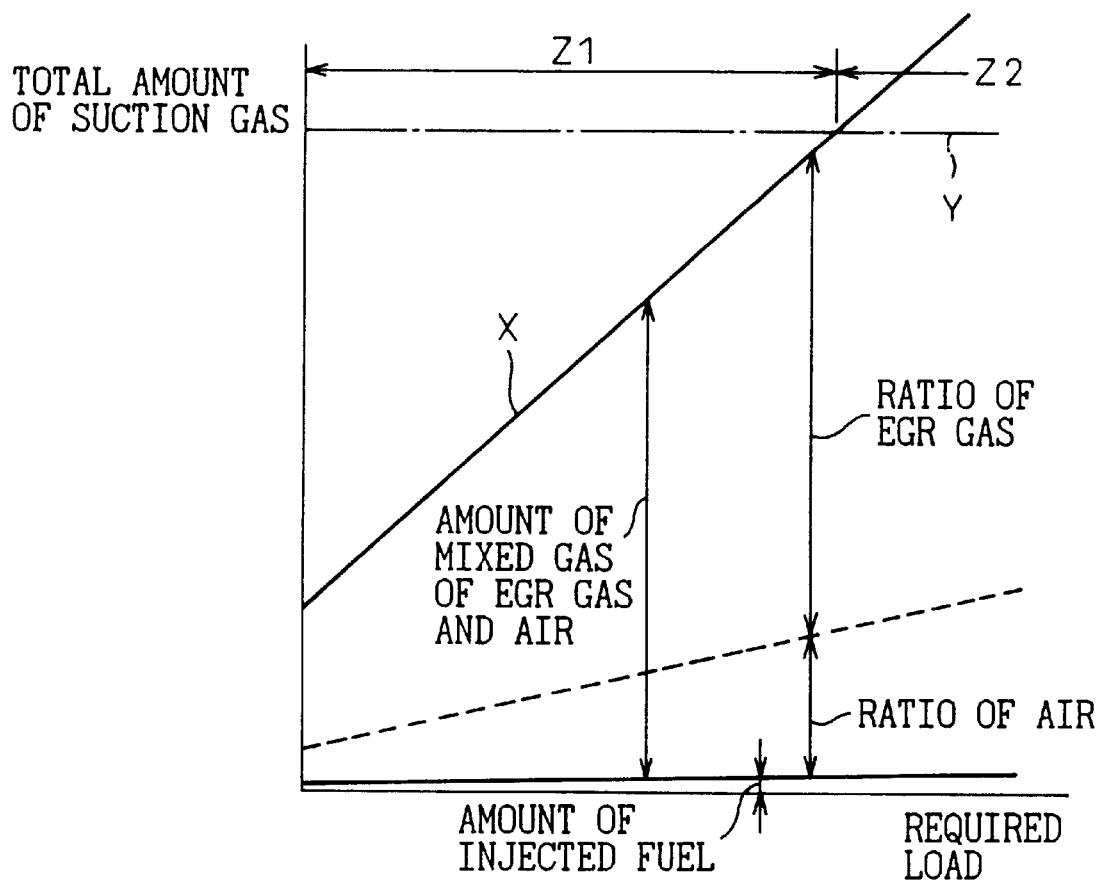
FIG. 7 is a view of the relationship between the amount of injected fuel and the amount of mixed gas.

FIG. 7 shows the amount of mixed gas of EGR gas and air, the ratio of air in the mixed gas, and the ratio of EGR gas in the mixed gas required for making the temperatures of the fuel and the gas around it at the time of combustion a temperature lower than the temperature at which soot is produced in the case of use of EGR gas as an inert gas. Note that in FIG. 7, the ordinate shows the total amount of suction gas taken into the combustion chamber 5. The broken line Y shows the total amount of suction gas able to be taken into the combustion chamber 5 when supercharging is not being performed. Further, the abscissa shows the required load. Z1 shows the low load operating region.

Referring to FIG. 7, the ratio of air, that is, the amount of air in the mixed gas, shows the amount of air necessary for causing the injected fuel to completely burn. That is, in the case shown in FIG. 7, the ratio of the amount of air and the amount of injected fuel becomes the stoichiometric air-fuel ratio. On the other hand, in FIG. 7, the ratio of EGR gas, that is, the amount of EGR gas in the mixed gas, shows the minimum amount of EGR gas required for making the temperatures of the fuel and the gas around it a temperature lower than the temperature at which soot is produced. This amount of EGR gas is, expressed in terms of the EGR rate, about at least 55 percent and, in the embodiment shown in FIG. 7, is at least 70 percent. That is, if the total amount of suction gas taken into the combustion chamber 5 is made the solid line X in FIG. 7 and the ratio between the amount of air and amount of EGR gas in the total amount of suction gas X is made the ratio shown in FIG. 7, the temperatures of the fuel and the gas around it becomes a temperature lower than the temperature at which soot is produced and therefore no soot at all is produced any longer. Further, the amount of NOx produced at this time is around 10 ppm or less and therefore the amount of NOx produced becomes extremely small.

If the amount of fuel injected increases, the amount of heat generated at the time of combustion increases, so to maintain the temperatures of the fuel and the gas around it at a temperature lower than the temperature at which soot is produced, the amount of heat absorbed by the EGR gas must be increased. Therefore, as shown in FIG. 7, the amount of EGR gas has to be increased the greater the amount of injected fuel. That is, the amount of EGR gas has to be increased as the required load becomes higher.

On the other hand, in the load region Z2 of FIG. 7, the total amount of suction gas X required for inhibiting the production of soot exceeds the total amount of suction gas Y which can be taken in. Therefore, in this case, to supply the total amount of suction gas X required for inhibiting the production of soot into the combustion chamber 5, it is necessary to supercharge or pressurize both of the EGR gas and the suction gas or the EGR gas. When not supercharging or pressurizing the EGR gas etc., in the load region Z2, the total amount of suction gas X matches with the total amount of suction gas Y which can be taken in. Therefore, in the case, to inhibit the production of soot, the amount of air is reduced somewhat to increase the amount of EGR gas and the fuel is made to burn in a state where the air-fuel ratio is rich.

As explained above, FIG. 7 shows the case of combustion of fuel at the stoichiometric air-fuel ratio. In the low load operating region Z1 shown in FIG. 7, even if the amount of air is made smaller than the amount of air shown in FIG. 7, that is, even if the air-fuel ratio is made rich, it is possible to obstruct the production of soot and make the amount of NOx produced around 10 ppm or less. Further, in the low load region Z1 shown in FIG. 7, even if the amount of air is made greater than the amount of air shown in FIG. 7, that is, the average value of the air-fuel ratio is made a lean 17 to

18, it is possible to obstruct the production of soot and make the amount of NOx produced around 10 ppm or less.

That is, when the air-fuel ratio is made rich, the fuel becomes in excess, but since the fuel temperature is suppressed to a low temperature, the excess fuel does not grow into soot and therefore soot is not produced. Further, at this time, only an extremely small amount of NOx is produced. On the other hand, when the average air-fuel ratio is lean or when the air-fuel ratio is the stoichiometric air-fuel ratio, a small amount of soot is produced if the combustion temperature becomes higher, but in the present invention, the combustion temperature is suppressed to a low temperature, so no soot at all is produced. Further, only an extremely small amount of NOx is produced.

In this way, in the engine low load operating region Z1, regardless of the air-fuel ratio, that is, whether the air-fuel ratio is rich or the stoichiometric air-fuel ratio or the average air-fuel ratio is lean, no soot is produced and the amount of NOx produced becomes extremely small. Therefore, considering the improvement of the fuel efficiency, it may be said to be preferable to make the average air-fuel ratio lean.

In the new system of combustion used in the present invention, however, it is necessary to make the EGR rate at least more than about 55 percent so as to simultaneously reduce the soot and NOx. It is however only possible to make the EGR rate more than about 55 percent when the amount of intake air is small, that is, when the engine low is relatively low. Once the amount of intake air exceeds a certain limit, that is, the required load becomes higher than a certain limit, it is no longer possible to increase the amount of intake air without lowering the EGR rate. In this case, in the example of the experiment shown in FIG. 3, however, if the EGR is allowed to gradually fall from about 65 percent along with the increase of the amount of intake air, that is, if the air-fuel ratio is gradually increased along with the required load becoming higher, a large amount of smoke will be produced. Therefore, when the required load exceeds a certain limit, it is not possible to make the EGR rate gradually fall from about 65 percent and gradually increase the air-fuel ratio as the required load becomes higher.

In this case, to prevent the production of a large amount of smoke, it is necessary to jump over the range of EGR rate from about 40 percent to about 65 percent where a large amount of smoke is produced when the required load exceeds the certain limit. Therefore, in this embodiment of the present invention, when the required load is low, the EGR rate is maintained at least above about 55 percent and when the required load becomes higher and it is no longer possible to maintain the EGR rate at over about 55 percent, the EGR rate is made to fall stepwise to not more than about 50 percent. At this time, the air-fuel ratio simultaneously becomes larger stepwise.

When the EGR rate is above about 55 percent, as explained above, the temperature of the fuel and the gas surrounding it becomes a temperature lower than the temperature at which soot is produced. At this time, first combustion, that is, low temperature combustion, is performed. As opposed to this, when the EGR rate is reduced to less than about 50 percent, the temperature of the fuel and the gas surrounding it becomes higher than the temperature at which soot is produced. At this time, the first combustion, that is, low temperature combustion, can no longer be performed. In the embodiment of the present invention, when the low temperature combustion cannot be performed in this way, second combustion, that is, the conventionally normally performed combustion, is performed. Note that the first combustion, that is, the low temperature combustion, as clear from the explanation up to here, means combustion where the amount of inert gas in the combustion chamber is larger than the amount of inert gas where the amount of production of the soot peaks and where almost no soot is produced, while the second combustion, that is, the conventionally normally performed combustion, means combustion where the amount of inert gas in the combustion chamber is smaller than the amount of inert gas where the amount of production of soot peaks.

Figure 8:
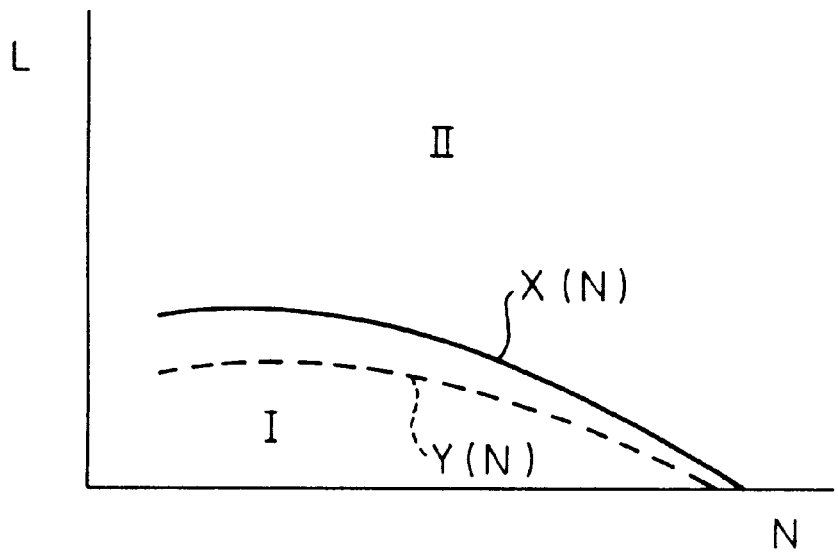
FIG. 8 is a view of a first operating region I and a second operating region II.

FIG. 8 shows a first operating region I where the EGR rate is made at least about 55 percent and first combustion, that is, the low temperature combustion, is performed, and a second operating region II where the EGR rate is made not more than about 50 percent and second combustion, that is, the combustion by the conventional combustion method, is performed. Note that in FIG. 8, the abscissa L shows the amount of depression of the accelerator pedal 40, that is, the required load, and the ordinate N shows the engine rotational speed. Further, in FIG. 8, X(N) shows a first boundary between the first operating region I and the second operating region II, while Y(N) shows a second boundary between the first operating region I and the second operating region II. The change of the operating region from the first operating region I to the second operating region II is judged based on the first boundary X(N), while the change of the operating region from the second operating region II to the first operating region I is judged based on the second boundary Y(N).

That is, when the engine is operating in the first operating region I and first combustion, that is, low temperature combustion, is being performed, if the required load L exceeds the first boundary X(N), which is a function of the engine rotational speed N, it is judged that the operating region has shifted to the second operating region II and second combustion is switched to. Next, when the required load L becomes lower than the second boundary Y(N), which is a function of the engine rotational speed N, it is judged that the operating region has shifted to the first operating region and the second combustion is switched to the first combustion.

The two boundaries, that is, the first boundary X(N) and the second boundary Y(N) at the lower load side from the first boundary X(N), are provided for the following two reasons. The first reason is that at the high load side of the second operating region II, the combustion temperature is relatively high and even if the required load L becomes lower than the first boundary X(N) at that time, low temperature combustion cannot be performed immediately. That is, unless the required load L becomes considerably low, that is, becomes lower than the second boundary Y(N), low temperature combustion cannot be started immediately. The second reason is to provide hysteresis with respect to the change of the operating regions between the first operating region I and the second operating region II.

Figure 9:
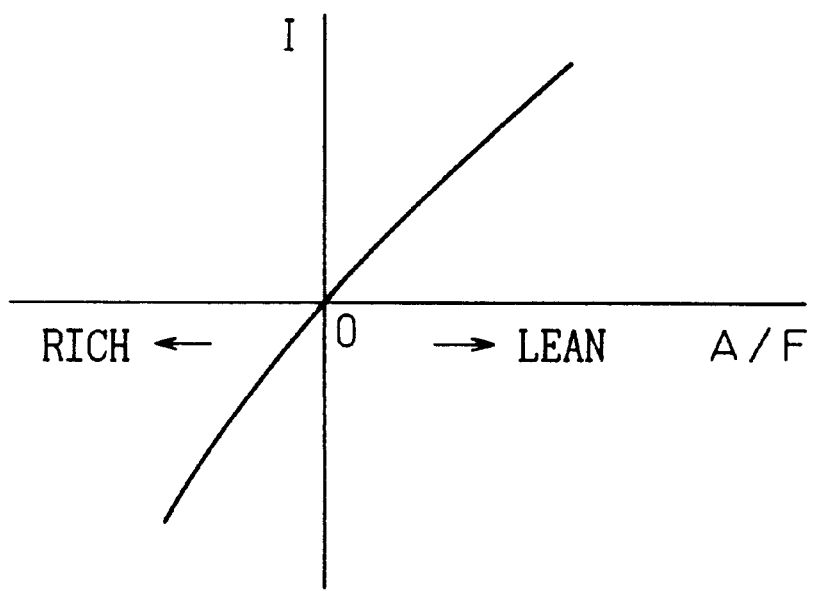
FIG. 9 is a view of the output of the air-fuel ratio sensor.

FIG. 9 shows the output of the air-fuel ratio sensor 23. As shown in FIG. 9, the output current I of the air-fuel ratio sensor 23 changes in accordance with the air-fuel ratio A/F. Therefore, it is possible to determine the air-fuel ratio from the output current I of the air-fuel ratio sensor 23.

Next, an explanation will be given of a detailed example of the control of the operation in the first operating region I and the second operating region II with reference to FIG. 10.

Figure 10:
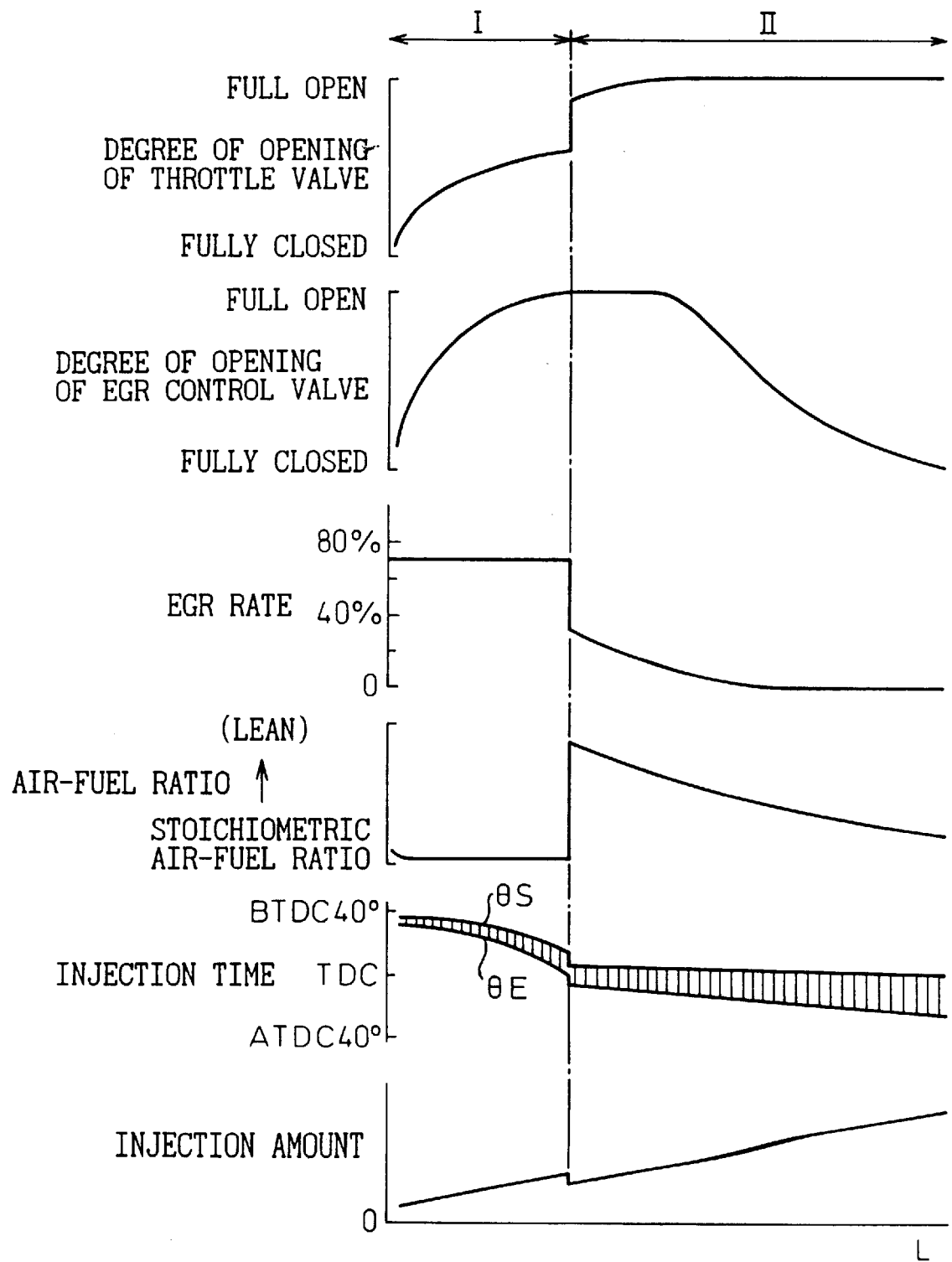
FIG. 10 is a view of the opening degree of a throttle valve etc.

FIG. 10 shows the opening degree of the throttle valve 18, the opening degree of the EGR control valve 25, the EGR rate, the air-fuel ratio, the injection timing, and the amount of injection with respect to the required load L. As shown in FIG. 10, in the first operating region I with the low required load L, the opening degree of the throttle valve 18 is gradually increased from close to the fully closed state to the half opened state as the required load L becomes higher, while the opening degree of the EGR control valve 25 is gradually increased from close to the fully closed state to the fully opened state as the required load L becomes higher. Further, in the example shown in FIG. 10, in the first operating region I, the EGR rate is made about 70 percent and the air-fuel ratio is made a lean air-fuel ratio from 15 to 18.

In other words, in the first operating region I, the opening degree of the throttle valve 18 and the opening degree of the EGR control valve 25 are controlled so that the EGR rate becomes about 70 percent and the air-fuel ratio becomes a lean air-fuel ratio of 15 to 18. Note that at this time, the air-fuel ratio is controlled to the target lean air-fuel ratio by correcting the opening degree of the throttle valve 18, the opening degree of the EGR control valve 25, or the fuel injection amount based on the output signal of the air-fuel ratio sensor 23. Further, in the first operating region I, the fuel is injected before top dead center of the compression stroke TDC. In this case, the injection start timing θS becomes later the higher the required load L. The injection completion timing θE also becomes later the later the injection start timing θS.

As mentioned above, during idling operation, the throttle valve 18 is made to close to close to the fully closed state. At this time, the EGR control valve 25 is also made to close to close to the fully closed state. If the throttle valve 18 closes to close to the fully closed state, the pressure in the combustion chamber 5 at the start of compression will become low, so the compression pressure will become small. If the compression pressure becomes small, the amount of compression work by the piston 4 becomes small, so the vibration of the engine body 1 becomes smaller. That is, during idling operation, the throttle valve 18 can be closed to close to the fully closed state to suppress vibration in the engine body 1.

On the other hand, when the engine operating state changes from the first operating region I to the second operating region II, the opening degree of the throttle valve 18 is made to increase stepwise from the half opened state to the fully opened state. At this time, in the example shown in FIG. 10, the EGR rate is made to be reduced stepwise from about 70 percent to not more than 40 percent and the air-fuel ratio is enlarged stepwise. That is, since the EGR rate jumps over the range of EGR rate where a large amount of smoke is produced, a large amount of smoke is no longer produced when the engine operating region changes from the first operating region I to the second operating region II.

In the second operating region II, the second combustion, that is, the conventionally performed combustion, is performed. In this combustion method, some soot and NOx are produced, but the heat efficiency is higher than with low temperature combustion and therefore when the engine operating region changes from the first operating region I to the second operating region II, as shown in FIG. 10, the amount of injection is made to be reduced stepwise.

At the second operating region II, the throttle valve 18 is except in some cases held in the fully opened state and the opening degree of the EGR control valve 25 is made smaller the higher the required load L. Therefore, the EGR rate becomes lower the higher the required load L and the air-fuel ratio becomes smaller the higher the required load L. Even if the required load L becomes high, however, the air-fuel ratio is made a lean air-fuel ratio. Further, in the second operating region II, the injection start timing θS is made close to the top dead center of the compression stroke TDC.

The $NO_x$ absorbent 21 contained in the casing 22 is for example composed of alumina as a carrier and carries on the carrier for example at Least one element selected from an alkali metal such as potassium K, sodium Na, lithium Li, or cesium Cs, an alkali earth such as barium Ba or calcium Ca, and a rare earth such as lanthanum La or yttrium Y plus a precious metal such as platinum Pt. When the ratio of the air and fuel (hydrocarbons) supplied in the intake passage of the engine and in the exhaust passage upstream of the $NO_x$ absorbent is referred to as an air-fuel ratio of the inflowing exhaust gas flowing to the $NO_x$ absorbent 21, this $NO_x$ absorbent 21 performs an action of absorbing and releasing NOx, i.e., absorbing NOx when the air-fuel ratio of the inflowing exhaust gas is lean and releasing the absorbed $NO_x$ when the air-fuel ratio of the inflowing exhaust gas becomes the stoichiometric air-fuel ratio or rich. Note that when no fuel (hydrocarbons) or air is supplied in the exhaust passage upstream of the NOx absorbent 21, the air-fuel ratio of the inflowing exhaust gas matches the air-fuel ratio in the combustion chamber 5 and therefore in this case the NOx absorbent 21 absorbs the NOx when the air-fuel ratio in the combustion chamber 5 is lean and releases the absorbed NOx when the air-fuel ratio in the combustion chamber 5 becomes the stoichiometric air-fuel ratio or rich.

If the NOx absorbent 21 is disposed in the exhaust passage of the engine, the NOx absorbent 21 actually performs the NOx absorbing and releasing action, but the detailed mechanism behind this absorbing and releasing action is not clear in portions. This absorbing and releasing action, however, is believed to be performed by the mechanism shown in FIGS. 11A and 11B. Next, an explanation of this mechanism will be given taking as an example the case of carrying platinum Pt and barium Ba on a carrier, but the mechanism is the same even if another precious metal, alkali metal, alkali earth, or rare earth is used.

Figure 11A:
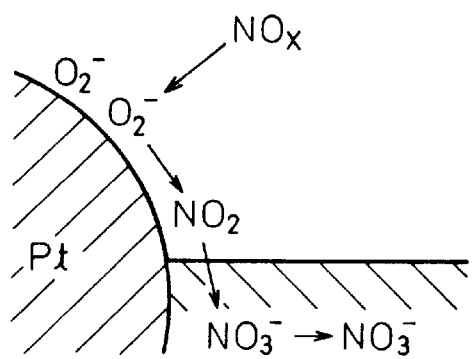
FIGS. 11A and 11B are views for explaining the absorbing and releasing action of NOx.

In the compression ignition type engine shown in FIG. 1, combustion is normally performed in a state with a lean air-fuel ratio in the combustion chamber 5. When the combustion is performed in this way with the air-fuel ratio in the lean state, the concentration of oxygen in the exhaust gas is high. At this time, as shown in FIG. 11A, the oxygen $O_2$ deposits on the surface of the platinum Pt in the form of $O_2^-$ or $O^{2-}$. On the other hand, the NO in the inflowing exhaust gas reacts on the surface of the platinum Pt with the $O_2^-$ or $O^-$ to become $NO_2$ ($2NO+O_2 \rightarrow 2NO_2$). Part of the next produced $NO_2$ is absorbed in the absorbent while being oxidized on the platinum Pt and is diffused in the absorbent in the form of nitrate ions $NO_2^-$ as shown in FIG. 11A while bonding with the barium oxide BaO. The NOx is absorbed in the NOx absorbent 21 in this way. So long as the concentration of oxygen in the inflowing exhaust gas is high, $NO_2$ is produced on the surface of the platinum Pt. So long as the NOx absorption ability of the absorbent is not saturated, the $NO_2$ is absorbed in the absorbent and nitrate ions $NO_3^-$ are produced.

Figure 11B:
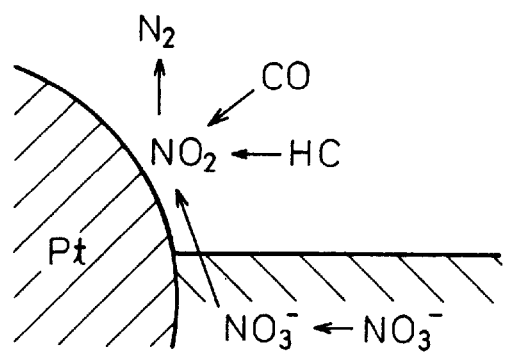

On the other hand, if the air-fuel ratio of the inflowing exhaust gas is made rich, the concentration of oxygen in the inflowing exhaust gas falls and as a result the amount of production of $NO_2$ on the surface of the platinum Pt falls. If the amount of production of $NO_2$ falls, the reaction proceeds in the opposite direction ($NO_3^- \rightarrow NO_2$) and therefore the nitrate ions $NO_3^-$ in the absorbent are released from the absorbent in the form of $NO_2$. At this time, the NOx released from the NOx absorbent 21 reacts with the large amount of unburned HC and CO contained in the inflowing exhaust gas and is reduced as shown in FIG. 11B. When there is no longer any $NO_2$ present on the surface of the platinum Pt in this way, the $NO_2$ is successively released from the absorbent. Therefore, when the air-fuel ratio of the inflowing exhaust gas is made rich, the NOx is released from the NOx absorbent 21 in a short time. Further, the released NOx is reduced, so NOx is not discharged into the atmosphere.

Note that in this case, NOx is released from the NOx absorbent 21 even if the air-fuel ratio of the inflowing exhaust gas is made the stoichiometric air-fuel ratio. When the air-fuel ratio of the inflowing exhaust gas is made the stoichiometric air-fuel ratio, however, since the NOx is only released gradually from the NOx absorbent 21, it takes a somewhat long time for all of the NOx absorbed in the NOx absorbent 21 to be released.

When as mentioned above, however, the engine is operating in the first operating region I and low temperature combustion is being performed, almost no soot is produced. Instead, the unburned hydrocarbons are exhausted from the combustion chamber 5 in the form of a soot precursor or a form before that. The NOx absorbent 21, however, has an oxidation function. Therefore, the unburned hydrocarbons exhausted from the combustion chamber 5 are made to be oxidized well by the NOx absorbent 21.

Figure 12A:
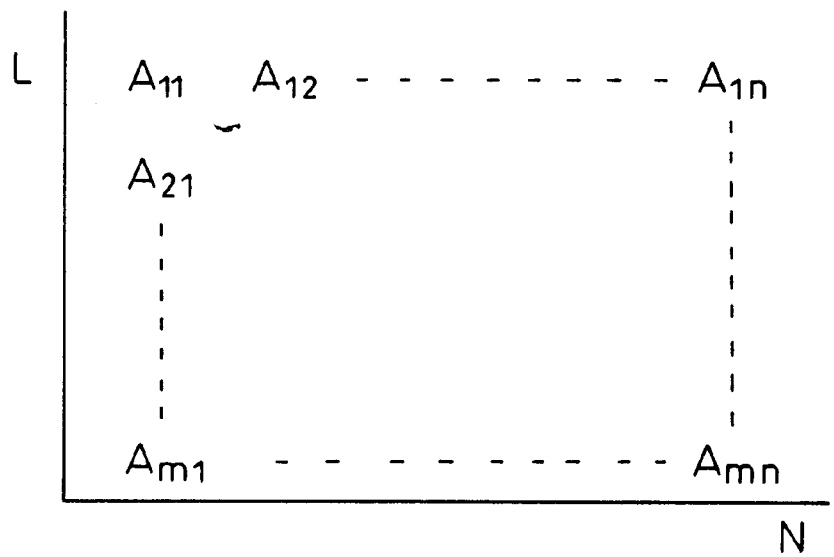
FIGS. 12A and 12B are views of maps of the amount of absorption of NOx per unit time.

On the other hand, there is a limit to the ability of the NOx absorbent 21 to absorb NOx. It is necessary to make the NOx be released from the NOx absorbent 21 before the ability of the NOx absorbent 21 to absorb NOx is saturated. Therefore, it is necessary to estimate the amount of NOx absorbed in the NOx absorbent 21. Therefore, in the present invention, the amount A of NOx absorbed per unit time when first combustion is being performed is found in advance in the form of the map shown in FIG. 12A as a function of the required load L and the engine rotational speed N, the amount B of NOx absorbed per unit time when second combustion is being performed is found in advance in the form of the map shown in FIG. 12B as a function of the required load L and the engine rotational speed N, and the amounts A and B of the NOx absorbed per unit time are cumulatively added to estimate the NOx amount $\Sigma NOX$ absorbed in the NOx absorbent 21.

In the embodiment of the present invention, when the NOx absorption amount $\Sigma NOx$ exceeds a predetermined allowable maximum value MAX, the NOx is made to be released from the NOx absorbent 21. Next, this will be explained with reference to FIG. 13 and FIG. 14.

Figure 13:
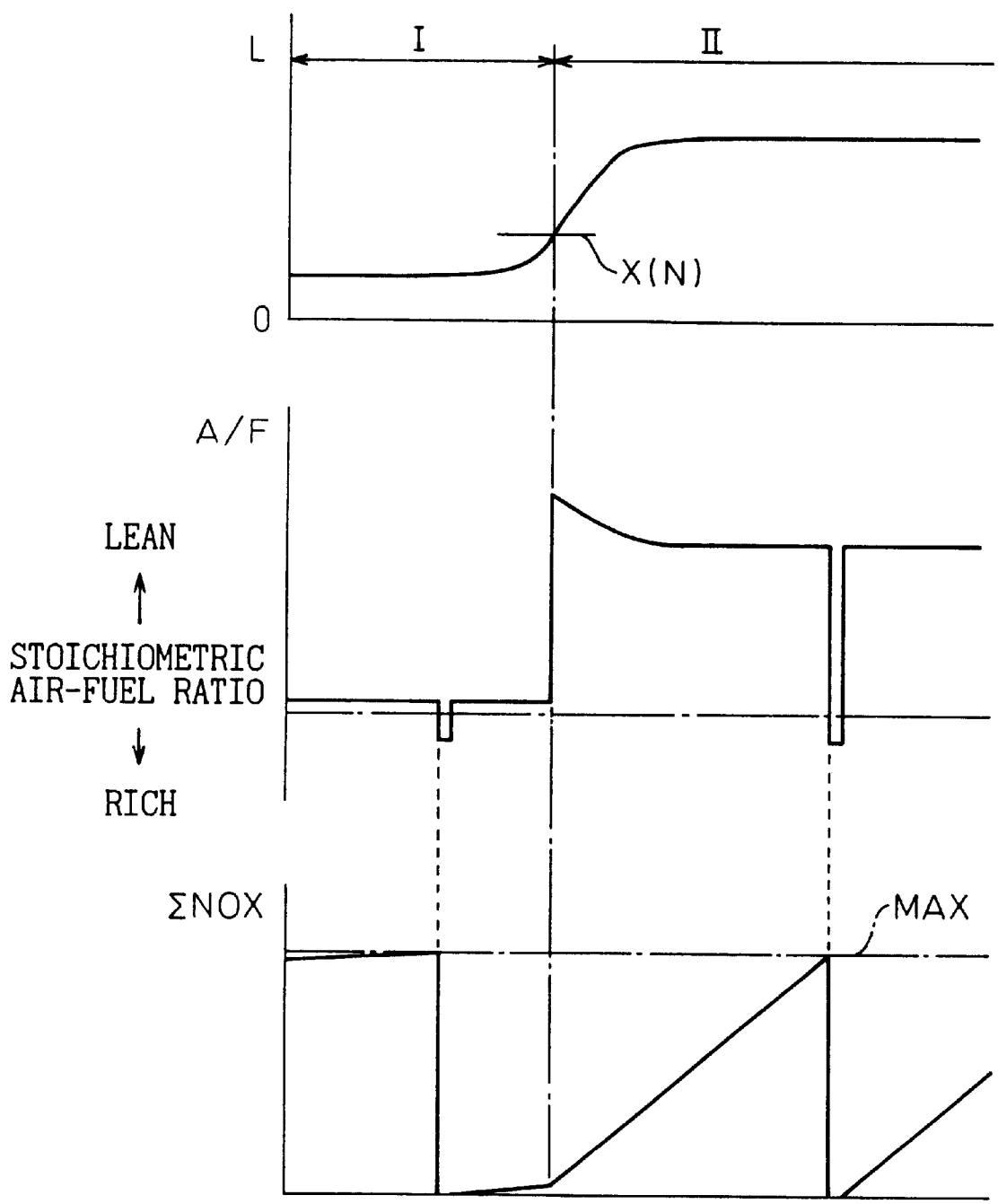
FIG. 13 is a time chart for explaining the control of the release of NOx.

FIG. 13 shows the required load L, the air-fuel ratio A/F in the combustion chamber 5, and the NOx absorption amount $\Sigma NOX$. Referring to FIG. 13, as explained above, in the first operating region I, first combustion is performed. At this time, the air-fuel ratio in the combustion chamber 5 becomes somewhat lean. At this time, the amount of production of NOx is extremely small and therefore the NOx absorption amount $\Sigma NOX$ increases little by little.

Next, when the NOx absorption amount $\Sigma NOX$ exceeds the allowable maximum value MAX when first combustion is being performed, as shown in FIG. 13, the air-fuel ratio A/F in the combustion chamber 5 is made temporarily rich. In this embodiment of the present invention, by increasing the amount of fuel injection at this time, the air-fuel ratio A/F in the combustion chamber 5 is made temporarily rich. If the air-fuel ratio A/F in the combustion chamber 5 is made rich, NOx is released from the NOx absorbent 21. As explained above, when first combustion, that is, low temperature combustion, is being performed, soot is not produced even if the air-fuel ratio A/F in the combustion chamber 5 is made rich, therefore it is possible to release NOx from the NOx absorbent 21 without the generation of soot.

Next, as shown in FIG. 13, when the required load L exceeds the first boundary X(N) and engine is operating in the second operating region II, second combustion, that is, the conventionally performed combustion, is performed. In the second combustion, the amount of production of NOx is large, therefore when the second combustion is started, the NOx amount $\Sigma NOX$ rapidly increases. Next, when the NOx amount $\Sigma NOX$ exceeds the allowable maximum value MAX when the second combustion is being performed, the air-fuel ratio A/F in the combustion chamber 5 is made rich. At this time, however, if the air-fuel ratio A/F in the combustion chamber 5 is made rich by increasing the amount of fuel injection, a large amount of soot ends up being produced.

Therefore, in this embodiment of the present invention, when the NOx absorption amount $\Sigma NOX$ exceeds the allowable maximum value MAX when the second combustion is being performed, the second combustion is switched to the first combustion and the air-fuel ratio A/F in the combustion chamber 5 is made rich under the first combustion. As explained above, there is no production of soot if the air-fuel ratio A/F in the combustion chamber 5 is made rich at the time of first combustion. Therefore, even when second combustion is being performed, NOx can be released from the NOx absorbent 21 without the generation of soot.

Figure 14:
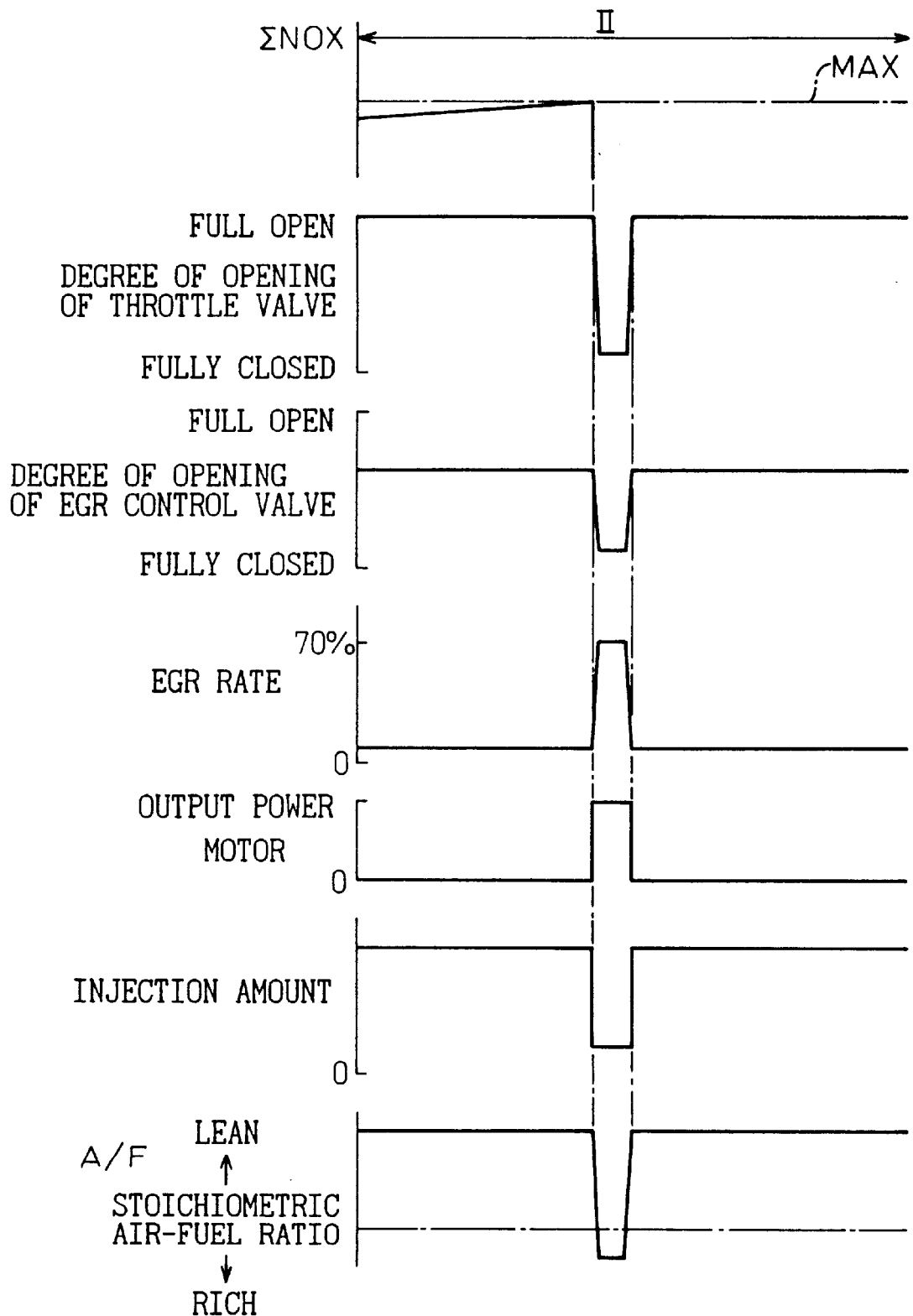
FIG. 14 is another time chart for explaining the control of the release of NOx.

However, the amount of fuel injection should be reduced and the EGR rate made larger to switch from the second combustion to the first combustion. In this case, as the injection amount, any injection amount in the first operating region I shown in FIG. 10 may be used. FIG. 14 shows as one example the case of reducing the amount of fuel injection to the minimum injection amount required for operation of the engine under a rich air-fuel ratio, for example, the injection amount required for idling operation at a lean air-fuel ratio, when switching from the second combustion to the first combustion.

That is, in the example shown in FIG. 14, if the NOx absorption amount $\Sigma NOX$ exceeds the allowable maximum value MAX when the second combustion is being performed, the opening degree of the throttle valve and the opening degree of the EGR control valve are made to close to the target opening degrees at the time of idling operation, whereby the EGR rate is made to increase to about 70 percent. Further, in the state with the EGR rate increased to about 70 percent, the injection amount is made to be reduced to the minimum injection amount required for making the air-fuel ratio A/F in the combustion chamber 5 rich.

On the other hand, if the injection amount is reduced to the injection amount required for the idling operation under a lean air-fuel ratio in this way, the output torque of the engine will sharply fall. Therefore, in this embodiment of the present invention, when switching from the second combustion to the first combustion, as shown in FIG. 14, the electric motor 32 is driven to make the electric motor 32 generate an output torque substantially equal to the amount of reduction of the output torque of the engine due to the reduction in the injection amount.

Figure 15:
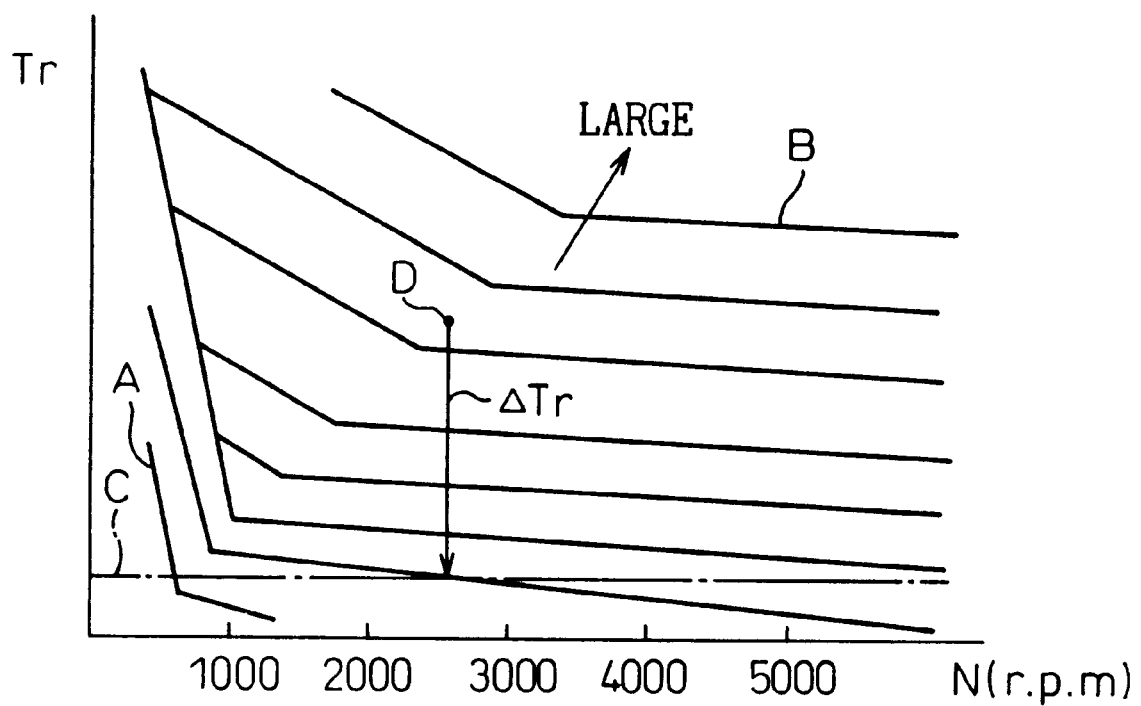
FIG. 15 is a view of the output torque of the engine.

The ordinate Tr in FIG. 15 shows the output torque of the engine, while the abscissa N shows the engine rotational speed. The solid lines show the relationship between the engine output torque Tr and the engine rotational speed N at the same amount of depression of the accelerator pedal 50. Further, the solid line A in FIG. 15 shows the case when the amount of depression of the accelerator pedal 50 is zero, while the solid line B shows the case when the amount of depression of the accelerator pedal 50 is maximum. The amount of depression of the accelerator pedal 50 increases from the solid line A to the solid line B.

In FIG. 15, the broken line C shows the output torque of the engine when the amount of fuel injection is made the injection amount required for idling operation. If assuming now that second combustion is being performed at the point D of FIG. 15 and that the amount of fuel injection to be switched to the first combustion in this state is switched to the amount of injection required for idling operation under a rich air-fuel ratio, the output torque Tr of the engine is made to be reduced by ΔTr at FIG. 15. At this time, in the embodiment of the present invention, the electric motor 32 driven so as to generate the output torque ΔTr, therefore the output torque generated at the output shaft 31 does not change.

Figure 16:
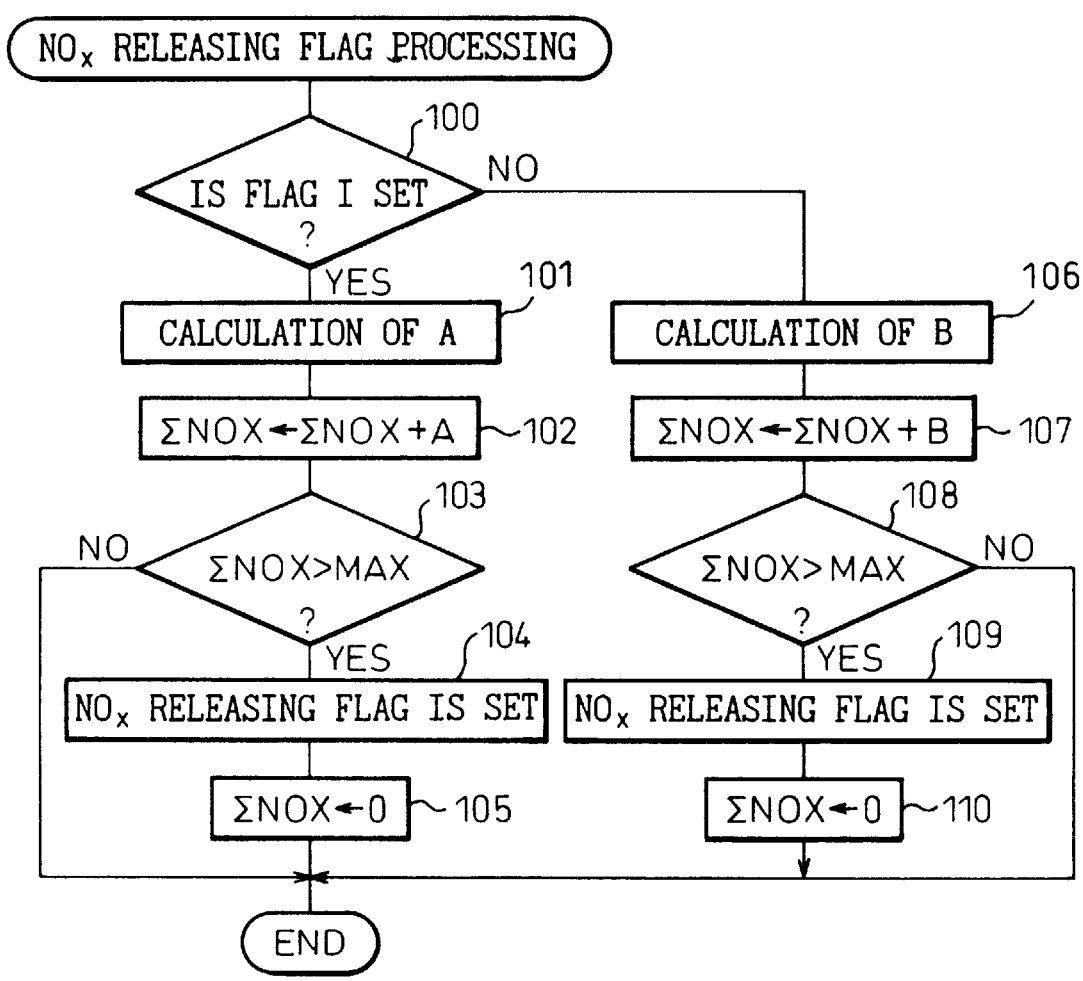
FIG. 16 is a flow chart of the processing relating to an NOx release flag.

FIG. 16 shows the processing routine for the NOx releasing flag set when NOx should be released from the NOx absorbent 21. This routine is executed every predetermined time interval.

Referring to FIG. 16, first, at step 100, it is judged if a flag I showing that the engine is operating in the first operating region I has been set or not. When the flag I has been set, that is, when the engine is operating in the first operating region I, the routine proceeds to step 101, where the NOx absorption amount A per unit time is calculated from the map shown in FIG. 12A. Next, at step 102, A is added to the NOx absorption amount ΣNOX. Next, at step 103, it is judged if the NOx absorption amount ΣNOX has exceeded the allowable maximum value MAX or not. When ΣNOX>MAX, the routine proceeds to step 104, where processing is performed to set the NOx releasing flag for a predetermined time, then ΣNOX is made zero at step 105.

Figure 12B:
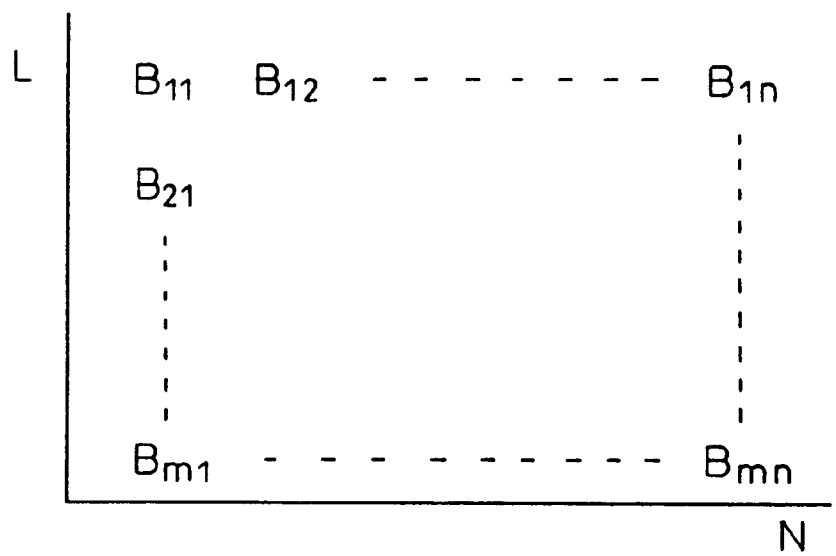

One the other hand when it is judged at step 100 that the flag I has been reset, that is, when the engine is operating in the second operating region II, the routine proceeds to step 106, where the NOx absorption amount B per unit time is calculated from the map shown in FIG. 12B. Next, at step 107, B is added to the NOx absorption amount ΣNOX. Next, at step 108, it is judged if the NOx absorption amount ΣNOX has exceeded the allowable maximum value MAX or not. When ΣNOX>MAX, the routine proceeds to step 109, where processing is performed to set the NOx releasing flag for a predetermined time, then ΣNOX is made zero at step 110.

Next, an explanation will be made of the control of the operation with reference to FIG. 17 and FIG. 18.

Figure 17:
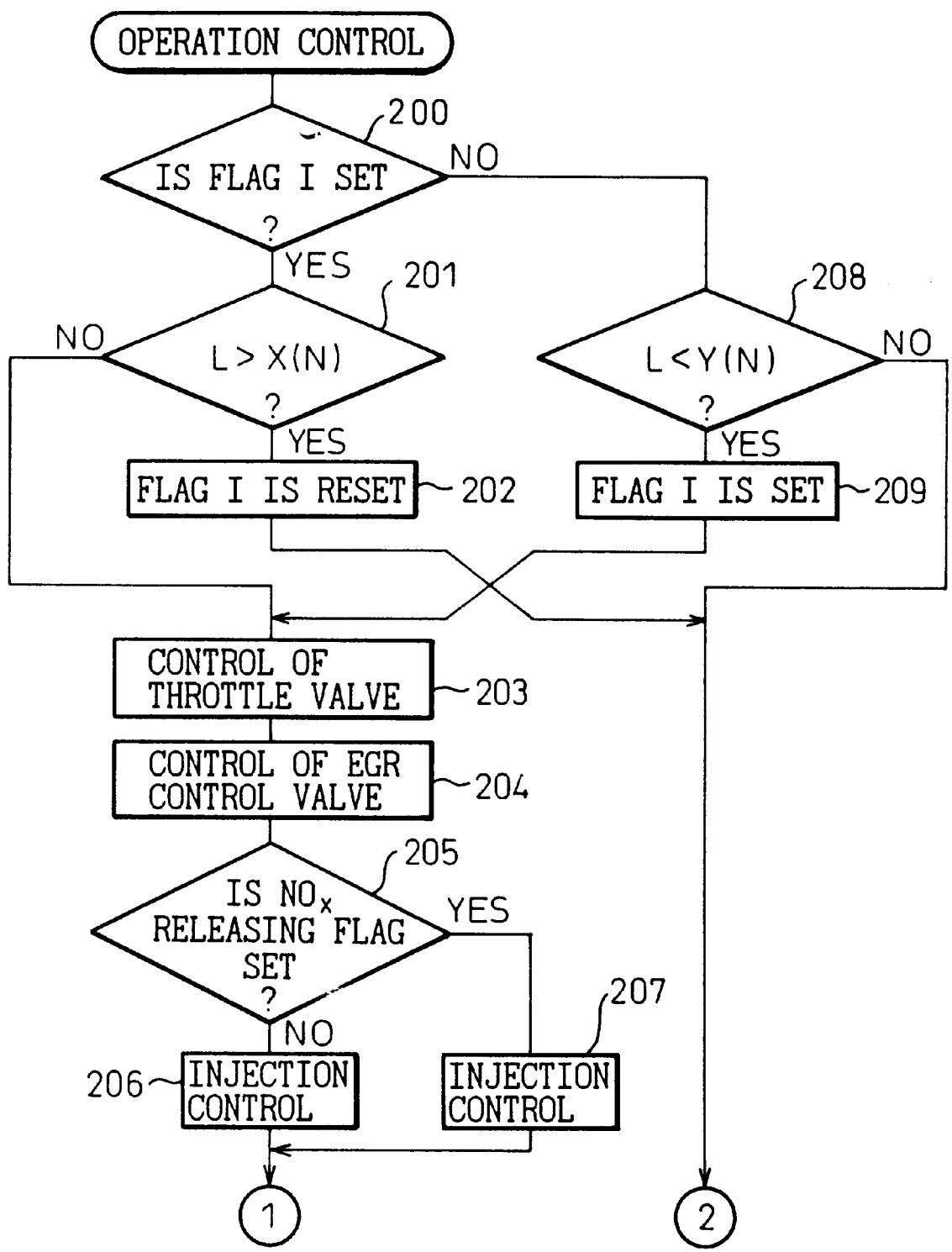
FIGS. 17 and 18 are flow charts of the routine for control of the operation.
Figure 18:
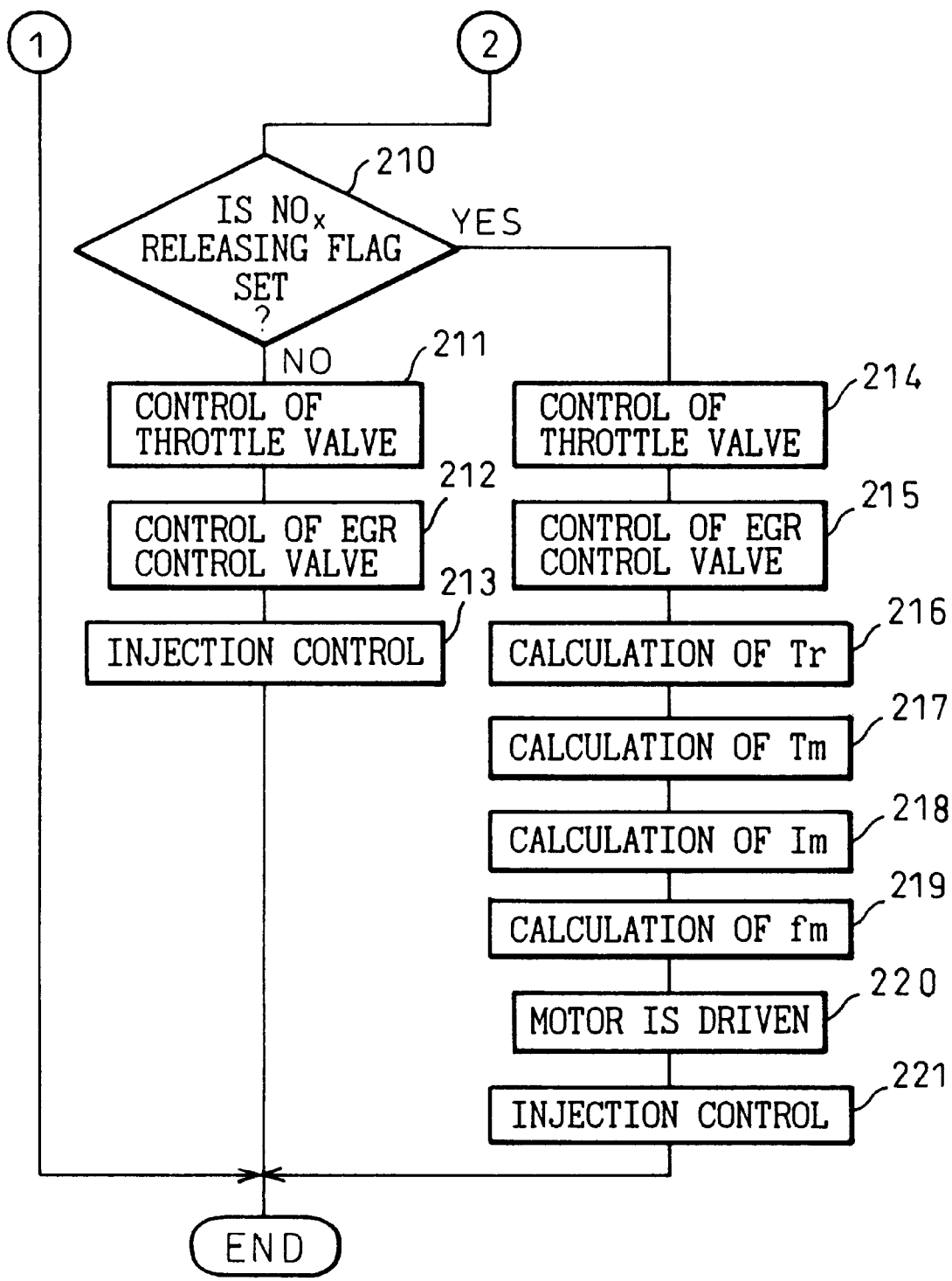

Referring to FIG. 17 and FIG. 18, first, at step 200, it is judged if the flag indicating that the engine is operating in the first operating region I has been set or not. When the flag I has been set, that is, when the engine is operating in the first operating region I, the routine proceeds to step 201, where it is judged if the required load L has become larger than the first boundary X(N) shown in FIG. 8 or not.

When L≦X(N), the routine proceeds to step 203, where the opening degree of the throttle valve 18 is controlled to an opening degree in accordance with the required load L shown in the first operating region I of FIG. 10. Next, at step 204, the opening degree of the EGR control valve 25 is controlled to an opening degree in accordance with the required load L shown in the first operating region I of FIG. 10. Next, at step 205, it is judged if the NOx releasing flag has been set or not. When the NOx releasing flag has not been set, the routine proceeds to step 206, where the injection amount, injection start timing θS, and injection completion timing θE in accordance with the required load L shown in the first operating region I of FIG. 10 are found and the fuel is injected based on the same.

On the other hand, when it is judged at step 201 that L>X(N), the routine proceeds to step 202, where the flag I is reset. Next, at step 210, it is judged if the NOx releasing flag has been set or not. When the NOx releasing flag has not been set, the routine proceeds to step 211, where the opening degree of the throttle valve 18 is controlled to an opening degree in accordance with the required load L shown in the second operating region II of FIG. 10. That is, the throttle valve 18 is made to open. Next, at step 212, the opening degree of the EGR control valve 25 is controlled to the opening degree in accordance with the required load L shown in the second operating region II of FIG. 10. Next, at step 213, the injection amount, injection start timing θS, and injection completion timing θE in accordance with the required load L shown in the second operating region II of FIG. 10 are found and the fuel is injected based on the same.

On the other hand, when it is judged at step 200 that the flag I has been reset, that is, when the engine is operating in the second operating region II, the routine proceeds to step 208, where it is judged if the required load L has become smaller than the second boundary Y(N) shown in FIG. 8. When L≧Y(N), the routine jumps to step 210. As opposed to this, when L<Y(N), the routine proceeds to step 209, where the flag I is set, then the routine proceeds to step 203.

On the other hand, when the first combustion is being performed, when it is judged at step 205 that the NOx releasing flag has been set, the routine proceeds to step 207, where the injection amount required for making the air-fuel ratio in the combustion chamber 5 rich is found. Further, the injection start timing θS shown in the first operating region I of FIG. 10 is found, the injection completion timing θE is found based on the injection amount, and the fuel is injected based on the same. At this time, the air-fuel ratio A/F in the combustion chamber 5 temporarily becomes rich. During this time, the NOx absorbed in the NOx absorbent 21 is released from the NOx absorbent 21.

On the other hand, when the second combustion is being performed, when it is judged at step 210 that the NOx releasing flag has been set, the routine proceeds to step 214, where a signal for reducing the opening degree of the throttle valve once to the target opening degree at the time of idling operation, then again increasing it to the target opening degree in accordance with the required load after the elapse of a certain time is given to the electric motor 17. Next, at step 215, a signal for reducing the opening degree of the EGR control valve once to the target opening degree at the time of idling operation, then increasing it again to the target opening degree in accordance with the required load after the elapse of a predetermined period is given to the EGR control valve 25.

Next, at step 216, the current engine output torque Tr is calculated from the relationship shown in FIG. 15 based on the amount of depression L of the accelerator pedal 50 and the engine rotational speed N. Next, at step 217, the amount of reduction ΔTr of the engine output torque when reducing the amount of fuel injection to the injection amount at the time of idling operation is made the output torque Tm to be generated by the electric motor 32. Next, at step 218, the current value Im of the three-phase alternating current to be supplied to the electric motor 32 for the electric motor 32 to generate the output torque Tm is calculated. Next, at step 219, the frequency fm of the three-phase alternating current to be supplied to the electric motor 32 is calculated based on the engine rotational speed N. Next, at step 220, a three-phase alternating current of a current value Im and a frequency fm is supplied to the electric motor 32, whereby the electric motor 32 is driven.

Next, at step 221, the amount of fuel injection required for making the air-fuel ratio in the combustion chamber 5 rich at the time of idling operation is found. Further, the injection start timing θS shown in the first operating region I of FIG. 10 is found, the injection completion timing θE is found based on the injection amount, and the fuel is injected based on this. At this time, the air-fuel ratio A/F in the combustion chamber 5 temporarily becomes rich. During this period, the NOx absorbed in the NOx absorbent 21 is released from the NOx absorbent 21.

Next, an explanation will be made of the control of the operation at the time of an acceleration operation and a deceleration operation. In the embodiment of the present invention, the electric motor 32 is driven at the time of acceleration operation so as to obtain an excellent acceleration operation even during an acceleration operation in the operating region where the exhaust turbocharger 14 is not operating. On the other hand, during a deceleration operation, the electric motor 32 is made to operate as a generator and the power generated is retrieved.

Figure 19:
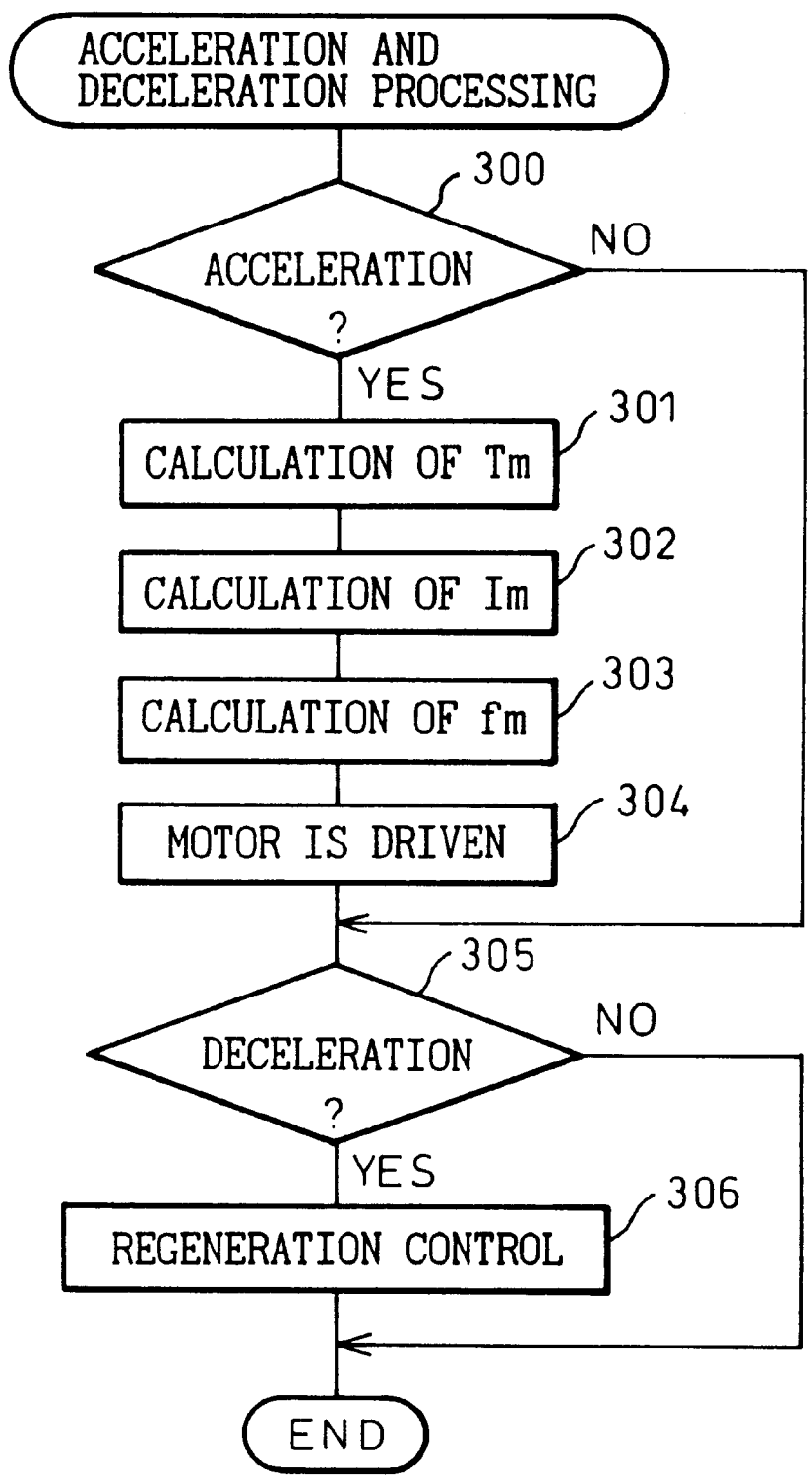
FIG. 19 is a flow chart of the processing for acceleration and deceleration.

FIG. 19 shows a processing routine at the time of acceleration and deceleration. This routine is executed by interruption at predetermined intervals.

Figure 20:
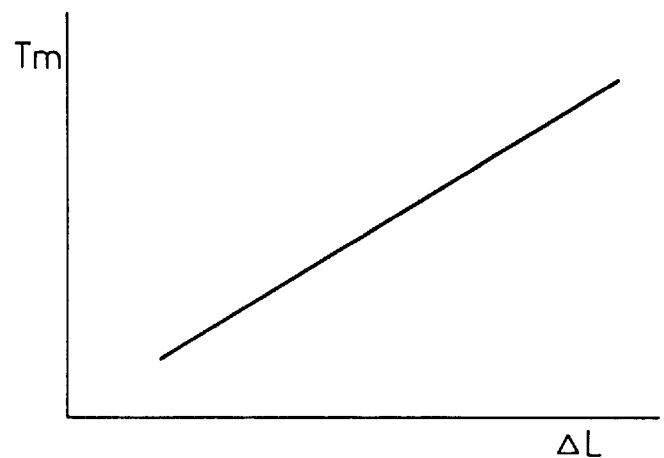
FIG. 20 is a view of the output torque to be generated by an electric motor.

Referring to FIG. 19, first, at step 300, it is judged if the engine is accelerating from the amount of change ΔL (>0) of the amount of depression L of the accelerator pedal 50, for example. When the engine is accelerating, the routine proceeds to step 201, where the output torque Tm to be generated by the electric motor 32 is calculated. The output torque Tm becomes larger the larger the amount of change ΔL of the amount of depression L of the accelerator pedal 50 as shown in FIG. 20. Next, at step 302, the current value Im of the three-phase alternating current to be supplied to the electric motor 32 for the electric motor 32 to generate the output torque Tm is calculated. Next, at step 303, the frequency fm of the three-phase alternating current to be supplied to the electric motor 32 is calculated based on the engine rotational speed N. Next, at step 304, the three-phase alternating current of the current value Im and the frequency fm is supplied to the electric motor 32, whereby the electric motor 32 is driven. In this way, at the time of an acceleration operation, the output torque of the electric motor is superposed over the output torque of the engine.

Next, at step 305, it is judged if the engine is decelerating from the amount of depression L of the accelerator pedal 50 and the engine rotational speed N, for example. When the engine is decelerating, the routine proceeds to step 306, where the electric motor 32 is made to operate as a generator and the power produced at that time is used to charge the battery 36.

Figure 21:
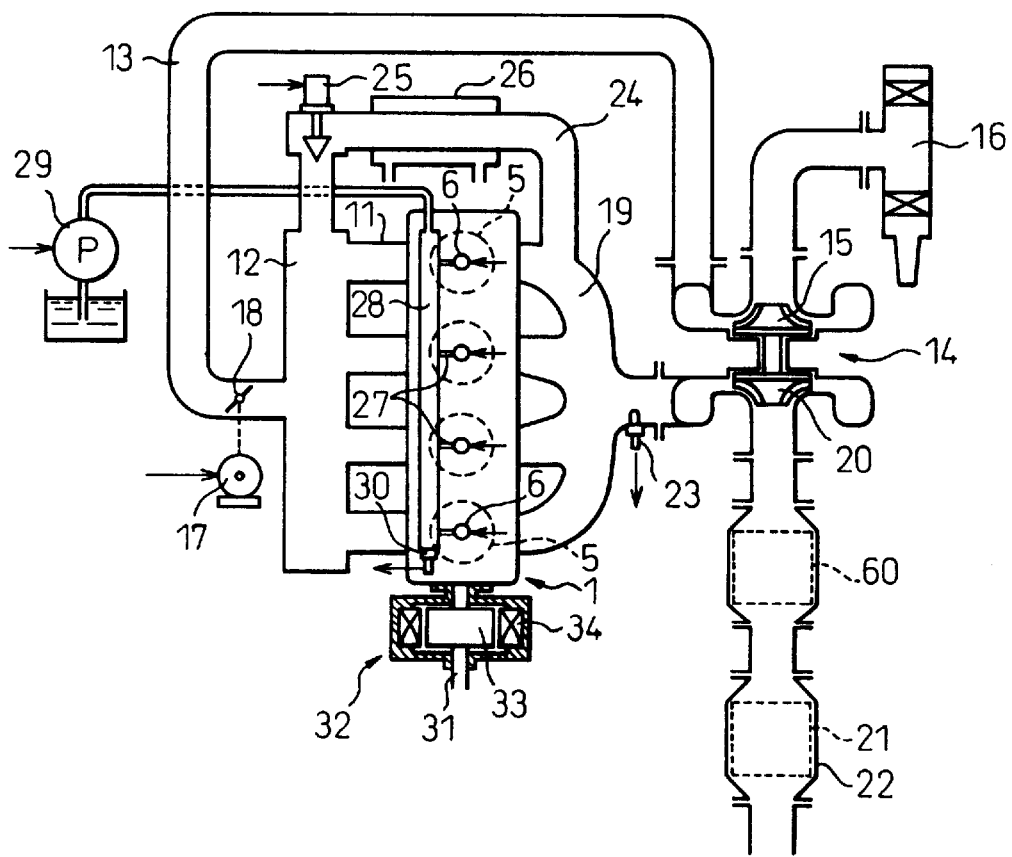
FIG. 21 is an overview of another embodiment of a compression ignition type engine.
Figure 22:
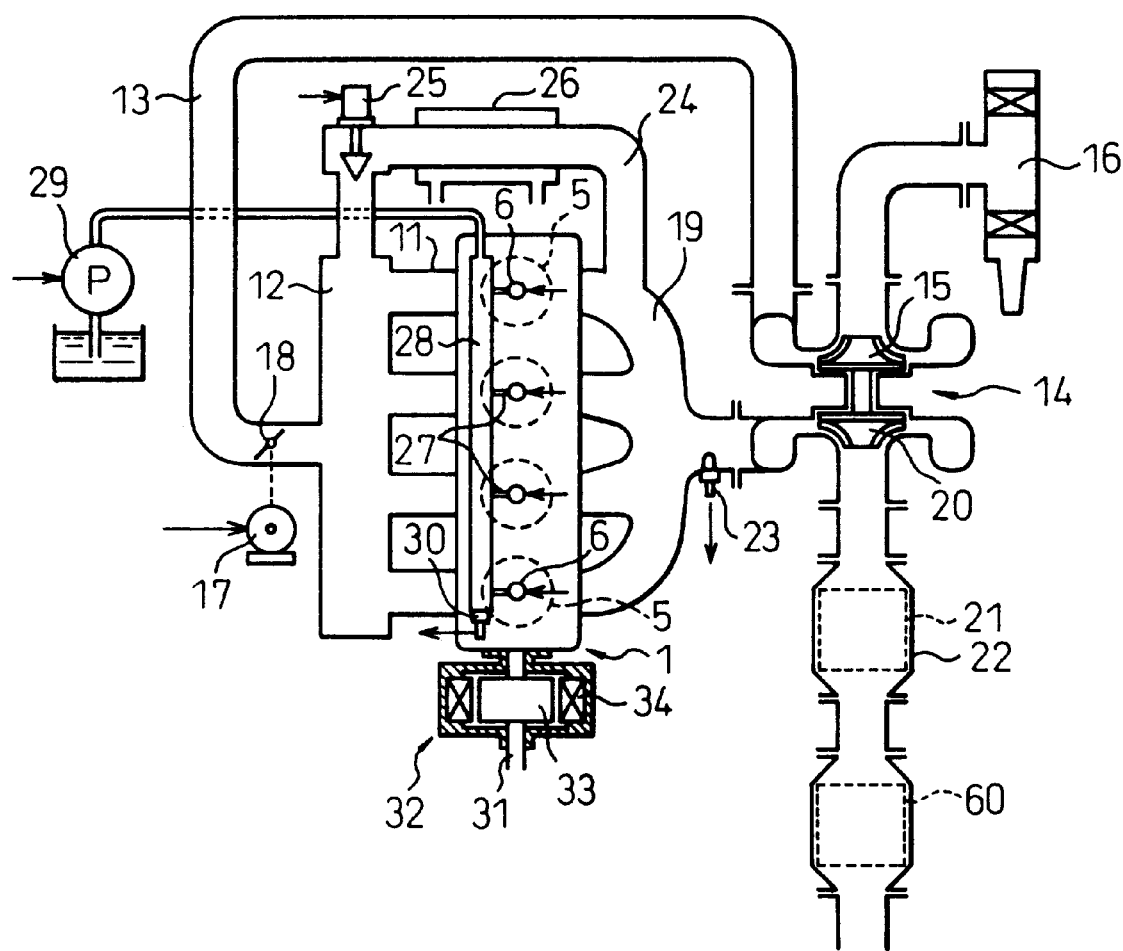
FIG. 22 is an overview of still another embodiment of a compression ignition type engine.

As explained above, the unburned hydrocarbons produced at the time of the first combustion are oxidized in the NOx absorbent 21. In the embodiment shown in FIG. 21, the unburned hydrogens are further oxidized well by disposing the catalyst 60 having an oxidation function comprised of an oxidation catalyst or three-way catalyst in the exhaust passage of the engine upstream of the NOx absorbent 21. In the embodiment shown in FIG. 22, the catalyst 60 having an oxidation function comprised of an oxidation catalyst or three-way catalyst is disposed in the exhaust passage of the engine downstream of the NOx absorbent 21.

According to the present invention, as mentioned above, it is possible to cause the release of NOx from the NOx absorbent without the generation of soot.

While the invention has been described by reference to specific embodiments chosen for purposes of illustration, it should be apparent that numerous modifications could be made thereto by those skilled in the art without departing from the basic concept and scope of the invention.

What is claimed is:

1. A compression ignition type engine in which an amount of production of soot gradually increases and then peaks when an amount of inert gas in a combustion chamber increases and in which a further increase of the amount of inert gas in the combustion chamber results in a temperature of fuel and surrounding gas at the time of combustion in the combustion chamber becoming lower than a temperature of production of soot and therefore almost no production of soot any longer, said engine comprising:

switching means for selectively switching between a first combustion where the amount of the inert gas in the combustion chamber is larger than the amount of inert gas where the amount of production of soot peaks and almost no soot is produced and a second combustion where the amount of inert gas in the combustion chamber is smaller than the amount of inert gas where the amount of production of soot peaks;

an NOx absorbent disposed in an exhaust passage of the engine and absorbing NOx when an air-fuel ratio of an exhaust gas flowing into the NOx absorbent is lean, said NOx absorbent releasing an absorbed NOx when the air-fuel ratio of the exhaust gas flowing into the NOx absorbent is rich or the stoichiometric air-fuel ratio; and drive power generating means for generating drive power separately from a drive power of the engine, wherein, when NOx is to be released from the NOx absorbent when the second combustion is being performed, the second combustion is switched to the first combustion and the air-fuel ratio in the combustion chamber is made rich or the stoichiometric air-fuel ratio by reducing an amount of fuel supplied to the engine and the drive power generating means generates the drive power.

2. A compression ignition type engine as set forth in claim 1, wherein said drive power generating means is comprised of an electric motor.

3. A compression ignition type engine as set forth in claim 1, wherein said drive power generating means generates an output torque substantially equal to an amount of reduction of an output torque of the engine due to a reduction in the amount of fuel supplied when switching from the second combustion to first combustion for releasing NOx from the NOx absorbent.

4. A compression ignition type engine as set forth in claim 3, wherein an output torque of the engine determined from an operating state of the engine is stored in advance, and said drive power generating means calculates an amount of reduction of the output torque of the engine from the stored output torque of the engine and generates an output torque substantially equal to the calculated amount of reduction of the output torque of the engine when switching from the second combustion to the first combustion.

5. A compression ignition type engine as set forth in claim 1, wherein the amount of fuel supplied is reduced to the amount of fuel supply required for idling operation under a rich air-fuel ratio or the stoichiometric air-fuel ratio when switching from the second combustion to the first combustion for release of the NOx from the NOx absorbent.

6. A compression ignition type engine as set forth in claim 1, wherein when the first combustion is being performed and NOx should be released from the NOx absorbent, the air-fuel ratio in the combustion chamber is made rich or the stoichiometric air-fuel ratio.

7. A compression ignition type engine as set forth in claim 1, wherein estimating means for estimating an amount of NOx absorbed in the NOx absorbent is provided, and it is judged that NOx should be released from the NOx absorbent when the amount of NOx estimated by the estimating means exceeds a predetermined NOx amount.

8. A compression ignition type engine as set forth in claim 1, wherein an exhaust gas recirculation device is provided for causing exhaust gas exhausted from the combustion chamber to recirculate in an intake passage of the engine, and said inert gas is comprised of a recirculated exhaust gas.

9. A compression ignition type engine as set forth in claim 8, wherein an exhaust gas recirculation rate when the first combustion is being performed is more than about 55 percent and an exhaust gas recirculation rate when the second combustion is being performed is not more than about 50 percent.

10. A compression ignition type engine as set forth in claim 8, wherein said exhaust gas recirculation apparatus is provided with an exhaust gas recirculation control valve for controlling an amount of the recirculated exhaust gas, a throttle valve is disposed in an intake passage, and the opening degree of the exhaust gas recirculation control valve and the opening degree of the throttle valve are made to be reduced when switching from the second combustion to the first combustion for release of the NOx from the NOx absorbent.

11. A compression ignition type engine as set forth in claim 1, wherein an engine operating region is divided into a low load side first operating region and a high load side second operating region, the first combustion is performed in the first operating region, and the second combustion is performed in the second operating region.

12. A compression ignition type engine as set forth in claim 1, wherein a catalyst having an oxidation function is arranged in an exhaust passage of the engine at one of upstream and downstream side of the NOx absorbent.

13. A compression ignition type engine as set forth in claim 1, wherein judging means for judging if the engine is accelerating is provided, and said drive power generating means generates drive power when it is judged that the engine is accelerating.

14. A compression ignition type engine as set forth in claim 1, wherein judging means for judging if the engine is decelerating is provided and said drive power generating means is comprised of an electric motor driven by a battery, and said electric motor is used as a generator and power generated from said generator is used to charge the battery when the engine is decelerating.

* * * * *